US009268043B2

(12) United States Patent
DeVolpi

(10) Patent No.: US 9,268,043 B2
(45) Date of Patent: Feb. 23, 2016

(54) RADIATION-MONITORING SYSTEM WITH CORRELATED HODOSCOPES

(71) Applicant: Alexander DeVolpi, Oceanside, CA (US)

(72) Inventor: Alexander DeVolpi, Oceanside, CA (US)

( * ) Notice: Subject to any disclaimer, the term of this patent is extended or adjusted under 35 U.S.C. 154(b) by 174 days.

(21) Appl. No.: 13/987,800

(22) Filed: Sep. 4, 2013

(65) Prior Publication Data
US 2015/0060686 A1 Mar. 5, 2015

(51) Int. Cl.
| | | |
|---|---|---|
| *G01T 3/00* | (2006.01) | |
| *G01T 1/00* | (2006.01) | |
| *G01T 1/29* | (2006.01) | |
| *G01T 7/00* | (2006.01) | |
| *G21C 17/00* | (2006.01) | |
| *G21D 1/00* | (2006.01) | |

(52) U.S. Cl.
CPC . *G01T 3/00* (2013.01); *G01T 1/006* (2013.01); *G01T 1/2921* (2013.01); *G01T 7/00* (2013.01); *G21C 17/00* (2013.01); *G21D 1/00* (2013.01)

(58) Field of Classification Search
CPC .......... G01T 1/2921; G01T 3/00; G01T 1/006
See application file for complete search history.

(56) References Cited

U.S. PATENT DOCUMENTS

| | | | | | |
|---|---|---|---|---|---|
| 3,777,161 | A | * | 12/1973 | Lee | 250/361 R |
| 5,821,541 | A | * | 10/1998 | Tumer | 250/370.09 |
| 2010/0102239 | A1 | * | 4/2010 | Hahn et al. | 250/363.05 |
| 2011/0142315 | A1 | * | 6/2011 | Hsieh et al. | 382/131 |

* cited by examiner

*Primary Examiner* — David Porta
*Assistant Examiner* — Mindy Vu
(74) *Attorney, Agent, or Firm* — John R. Ross; John R. Ross, III

(57) ABSTRACT

At least one pair of hodoscope radiation monitors arranged to simultaneously monitor a target region that contains a source of radiation. The hodoscopes are preferably arranged so that their fields of view of the region are approximately orthogonal. The fields of view of the two detectors will overlap in a region that contains the source of radiation. Each of the two detectors will record radiation from the overlap region and, in addition, will record background radiation emanating from other regions within detector fields of view. The present invention provides statistical correlation techniques to estimate the extent to which unusually high radiation originates in the overlap region, irrespective of background in the field-of-view of individual hodoscope detectors. The source of radiation might be spontaneous, might be from an activation process, or might be scattered in from an external beam.

15 Claims, 5 Drawing Sheets

RADIATION-MONITORING SYSTEM WITH CORRELATED HODOSCOPES

CROSS REFERENCE TO RELATED APPLICATIONS

This application is a Continuation-In-Part of Ser. No. 13/815,070, filed Jan. 28, 2013, which is hereby incorporated herein by reference, and claims the benefit of Provisional Patent Applications Ser. No. 61/744,473 filed Sep. 27, 2012 and Ser. No. 61/855,135 filed Jun. 14, 2013.

FIELD OF THE INVENTION

The present invention relates to radiation-monitoring and measuring equipment and systems and in particular to such systems designed to detect particular sources of radiation in the presence of relatively large background radiation.

BACKGROUND OF THE INVENTION

Radiation

Radiation can be classified as ionizing or non-ionizing. The word radiation is often colloquially used to refer to ionizing radiation such as x-ray and gamma rays. But the word radiation can also refer to non-ionizing radiation such as radio waves heat radiation and visible light. Radiation can also be classified by its ability to penetrate matter. Examples are alpha, beta and gamma radiation. Alpha particles are stopped by a sheet of paper while beta particles are stopped by an aluminum plate and gamma radiation is merely diminished as it penetrates lead. Neutron beams can be very penetrating. They do not ionize in the same way as charged particle radiation. Neutrons are absorbed, creating unstable nuclei that emit radiation.

Cargo Scanning

An important use of radiation monitors is the scanning of cargo especially at ports of entry into a country or other region to prevent entry of dangerous sources of radiation. In the United States, its Department of Homeland Security has the major responsibility to detect special nuclear materials and other dangerous cargo. Special radiation monitors are currently in use for scanning incoming cargo. A significant percentage of incoming cargo is currently being scanned by a variety of radiation monitors. Cargo is typically scanned for gamma radiation or sometime for neutron beams since these types of radiation will penetrate the walls of the shipping containers.

Nuclear Power Industry

Radiation monitors are widely used in the nuclear power industry primarily for control and monitoring sources of radiation.

Major Nuclear Power Plant Accidents

In more than a half-century of nuclear power, there have been several major accidents at commercial nuclear power plants that resulted in releases of significant or substantial radiation, evacuation of surrounding population, and huge financial costs for cleanup and power-generation displacement.

On Mar. 28, 1979, a minor malfunction initiated an accident sequence at the Three Mile Island Unit 2 (TMI-2) nuclear generating station near Harrisburg, Pa. During routine maintenance of the secondary coolant side, feedwater to the steam generators was inadvertently interrupted. The water loss caused the primary coolant system to overheat, resulting in an increase in primary-system pressure. A small valve had been opened to relieve pressure in the reactor, but it malfunctioned and failed to close. Lacking direct water-level instrumentation, the operators were not aware that cooling water was draining and events would be initiated that would cause the core to overheat. The instruments that monitored essential conditions inside the nuclear core provided misleading or inadequate information; as a result, plant operators shut down the very emergency water that would have cooled the nuclear core and prevented the subsequent accident.

Although the reactor-protective system automatically scrammed the reactor, it was not in sufficient time to prevent a loss-of-coolant accident and core meltdown. This event has been the most serious commercial nuclear accident in U.S. history, causing fundamental changes in the way nuclear power plants were operated and regulated. The accident itself progressed to the point where over 90% of the reactor core was damaged. No reactor personnel or members of the public received excessive doses of radiation or were injured. It was about five years before it was possible to carry out sufficient nuclear-core diagnostics so as to determine the extent and location of reactor fuel-debris re-concentration, and it required altogether about a ten years for the reactor to be decommissioned and defueled.

After the 2011 Tohoku earthquake and tsunami in Japan beginning Mar. 11, 2011, three reactors at the Fukushima Dai-ichi Nuclear Power Plant underwent loss-of-coolant accidents and core meltdowns. Evacuation, power-displacement, and related costs have been quite expensive and enduring, but no lives were lost as a result of the nuclear accidents. Because of tsunami-induced flood damage to backup reactor-water-cooling systems, improvised backup and emergency systems were not available in time to supply supplementary water cooling in the three reactors so as to prevent the loss-of-coolant accidents. To this day, the degree of fuel re-concentration is unknown in each of the disabled reactors.

A common problem resulting from the loss-of-coolant in the four cited accidents at water-cooled reactors has been the uncertainty and associated potential re-criticality nuclear hazard related to the uncontrolled re-concentration of fuel and debris. In addition, it would have been and remains invaluable to have the capability installed to assess—for the purposes of safe and timely decommissioning—the degree of fuel re-concentration and the level of cooling water maintained inside or outside the reactor pressure vessel, depending on the reactor design.

Hodoscope Nuclear Diagnostics

A hodoscope (from the Greek hodos, for way or path, and skopos, for an observer) is an instrument used to optimally detect radiation and to enhance determination of the radiation trajectory. Typical hodoscopes are comprised of multiple detector-collimating segments arranged in a pattern. As the radiation passes through collimating segments, the detectors associated with these segments record the selected radiation, and this information is then used to infer the direction from which the radiation originated. A typical detector segment is a piece of scintillating material, which emits light when the energy of a charge-producing particle is absorbed in the scintillator The emitted scintillation light can be measured by a photomultiplier tube (PMT) or its equivalent. If the PMT measures a significant amount of light, it can be inferred that radiation passed was absorbed in the scintillator.

A significant design requirement for nuclear diagnostics using a hodoscope consists of arrangements of the collimating and functional elements in such a manner as to minimize extraneous background radiation that might conflict with the desired source of radiation. Other important design requirements relate to spatial and time resolution.

Applicant's U.S. Pat. No. 4,092,542 "High-Resolution Radiography by Means of a Hodoscope," teaches that both neutron and gamma digitally-reconstructed radiographs of high spatial resolution are obtained from the hodoscope by the scanning operation of a collimator, by storing detector data outputs, and by rendering computer reconstruction of the data so obtained. The apparatus is adapted to detect fast neutrons, gamma rays, or both, and to use various combinations of the information obtained from fast neutrons and gamma rays to determine what was occurring within the field of view.

Applicant's U.S. Pat. No. 4,649,015 "Monitoring system for a liquid-cooled nuclear fission reactor", also referred to above, illustrates a system for detecting changes in water-coolant levels at various elevations of a water-cooled nuclear power reactor operating at full power. A pre-installed vertical array of gamma-radiation detectors was to be mounted at the inside wall of the reactor biological shield, and the detectors were to be collimated so that each received gamma radiation only from predetermined reactor-vessel elevations and axial positions. No known application is known to have followed from that patent.

The U.S. Pat. No. 4,649,015 was based on applicant's technical analysis that, during normal nuclear-reactor operation to produce steam and thus electrical power, neutrons released in the fission reaction were often thermalized and/or captured: in the water coolant, or in the steel reactor walls, and/or in nuclear fuel or control structures within the reactor vessel. Nuclear-reactor power production results in many neutrons being absorbed in the steel structure and containment, thereby often being converted to gamma radiation having an energy level of the energy range of 5-12 MeV (million electron volts).

Gamma-Ray Detectors

Gamma rays are a high-energy form of penetrating electromagnetic radiation. Gamma-ray photons can be counted individually. While most radiation-detection counters determine only the count rate (i.e. the number of gamma rays interacting in the detector, for example, in one second), a gamma-ray spectrometer also determines the energies of the gamma-ray photons emitted from a source.

Radioactive nuclei (radionuclides) commonly emit gamma rays in the energy range from a few keV to ~10 MeV. Such sources typically produce gamma-ray "line spectra" (i.e., many photons emitted at discrete energies). The boundary between gamma rays and X rays is somewhat blurred, as X rays typically refer to the high-energy electromagnetic emission of atoms, which may extend to over 100 keV. Huge numbers of gamma- and x-ray photons are released in the course of fission processes in nuclear-power plants.

Scintillation Detectors

Scintillation detectors use crystals that emit light when gamma rays interact with the atoms in the crystals. The intensity of the light produced is proportional to the energy deposited in the crystal by the gamma ray. The detectors are joined to photomultipliers (or their solid-state equivalent) that convert the light ultimately into an electrical signal and then amplify the electrical signal. Common scintillators include thallium-doped sodium-iodide (NaI(Tl))—often simplified to sodium-iodide (NaI)—and bismuth-germanate (BGO). Because photomultipliers are also sensitive to ambient light, scintillators are encased in light-tight coverings. NaI(Tl) has two principal advantages: It can be produced in large crystals, yielding good efficiency, and it produces intense bursts of light compared to other spectroscopic scintillators.

The Compton-effect, a form of gamma-radiation interaction, is represented by a continuous distribution at the lower pulse-height regions of the gamma-energy spectrum. The distribution arises because of primary gamma rays that undergo Compton-effect scattering within the crystal: Depending on the scattering angle, Compton-effect electrons have different energies and hence produce pulses in different energy channels. If too many gamma rays are present in a spectrum, Compton gamma-ray distributions can present analysis challenges.

Sodium-iodide detector systems, as with all scintillator systems, are sensitive to changes in temperature. Changes in the operating temperature caused by changes in environmental temperature will shift the spectrum on the horizontal axis.

Semiconductor Detectors

Semiconductor detectors, also called solid-state detectors, rely on detection of the charge carriers (electrons and holes) generated in semiconductors by energy deposited by gamma-ray photons. The arrival of the electron at the positive contact and the hole at the negative contact produces the electrical signal that is sent to the preamplifier, a multichannel amplifier (MCA), and on through the system for analysis. The movement of electrons and holes in a solid-state detector is very similar to the movement of ions within the sensitive volume of gas-filled detectors such as ionization chambers.

Common semiconductor-based detectors include germanium, cadmium telluride and cadmium zinc telluride. Germanium semiconductor detectors provide significantly improved energy resolution in comparison to sodium-iodide scintillation detectors, as explained in the preceding discussion. Germanium semiconductor detectors produce the highest resolution commonly available today, and cryogenic temperatures are vital to their operation.

Principles of Gamma Spectroscopy

The equipment used in gamma spectroscopy includes an energy-sensitive radiation detector, electronics to collect and process the signals produced by the detector—such as a pulse sorter (i,e. a single channel or multichannel analyzer)—and associated amplifiers and data readout devices to generate, display, and store the spectrum. Other components, such as rate meters and peak-position stabilizers, may also be included. The most common detectors in spectroscopy include sodium-iodide (NaI) scintillation counters and high-purity germanium detectors.

Gamma-spectroscopy detectors contain passive materials that are available for a gamma interaction to occur in the detector volume. The most important interaction mechanisms are the photoelectric effect, the Compton effect, and pair production. The photoelectric effect is preferred, as it absorbs all of the energy of the incident gamma ray. Full energy absorption is also possible when a series of these interaction mechanisms take place within the detector volume.

The voltage pulse ultimately produced by the detector (or by the photomultiplier in a scintillation detector) is usually shaped by a pre-amplifier and an amplifier. The amplitude of the voltage pulse can be measured and recorded by a single-channel analyzer (SCA) or a multi-channel analyzer (MCA). The analyzers take the very small voltage signal produced from the detector electronic processing system, and convert that analog signal into a digital signal. An analog-to-digital converter (ADC) also sorts pulses by their voltage amplitude. ADCs have specific numbers of "bins" into which the pulses can be sorted; these bins represent the channels in the spectrum, with each channel corresponding to a specific range of gamma-ray photon energy. In a single-channel analyzer, data is recorded for only one channel at a time whereas multi-channel analyzers record data for multiple channels simultaneously. The choice for number of channels for the MCA depends on the resolution of the system and the energy range being studied.

The SCA or MCA output is usually sent to a computer, which stores, displays, and analyzes the data. For hodoscope purposes, single channel pulse-amplitude analysis is often sufficient if the detected radiation exceeds a designated energy threshold.

Detector Performance

Gamma-detection systems are selected to take advantage of several detector-performance characteristics. Two of the most important include detector resolution and detector efficiency.

Gamma rays detected in a spectroscopic system produce amplitude peaks in the energy spectrum. The pulse width of the peaks is determined by the resolution of the detector, a very important characteristic of gamma-spectroscopic detectors. High resolution enables energy-separation of two gamma-ray lines that are close to each other in energy. Gamma-spectroscopy systems are designed and adjusted to produce symmetrical peaks of the best possible resolution. The peak shape is usually a Gaussian statistical pulse-energy distribution. For most spectra the horizontal-axis position of the peak is determined by the gamma-ray detection energy, and the area of the peak is determined by the intensity of the gamma ray and the efficiency of the detector.

The most common figure-of-merit used to express detector resolution is full-width-at-half-maximum (FWHM). This is the energy bandwidth of the gamma-ray peak at half of the highest point on the peak distribution. Resolution figures are given with reference to specified gamma-ray energies. Resolution can be expressed in absolute (i.e., eV or MeV) or relative terms. For example, a sodium iodide (NaI) detector may have a FWHM of 9.15 keV at 122 keV, and 82.75 keV at 662 keV. These resolution values are expressed in absolute terms. To express the resolution in relative terms, the FWHM pulse shape in eV or MeV is divided by the energy of the gamma ray. Using the preceding example, the resolution of the detector is 7.5% at 122 keV, and 12.5% at 662 keV. A germanium detector may give resolution of 560 eV at 122 keV, yielding a relative resolution of 0.46%.

Detector Efficiency

Not all gamma rays emitted by a source and passing through the (collimated) detector will produce a count in the system. The probability that an emitted gamma ray will interact with the detector and produce a count is the efficiency of the detector. In general, larger detectors have higher efficiency than smaller detectors, although the shielding properties of the detector material are also important factors. Detector efficiency is measured by comparing a spectrum from a source of known activity to the count rates in each peak to the count rates expected from the known intensities of each gamma ray. "Efficiency," like resolution, can be expressed in absolute or relative terms. Absolute efficiency values represent the probability that a gamma ray of a specified energy passing through the detector will interact and be detected. The energy of the gamma rays being detected is an important factor in the efficiency of the detector.

Radiation detectors may be operated in a "current" mode, in addition to the aforesaid "pulse" mode. In the current mode, pulses are integrated over a time interval such that the output of the detector is a small measurable electrical current, rather than single pulses. Current mode is usually used in situations that involve very high pulse rates and preferably high signal/background ratios.

Calibration and Background

If a gamma spectrometer is used for identifying samples of unknown composition, its energy scale must be calibrated. Calibration is performed by using the peaks of a known radioactive source, such as cesium-137 or cobalt-60. If the channel number is proportional to energy, the channel scale can then be converted to an energy scale.

Because some radioactivity is present everywhere (i.e., background radiation), the gamma spectrum should ideally be analyzed when no source is present. In any event, background radiation must be kept to a minimum and its effects subtracted from the actual measurement.

The heavy-element lead and other high-density absorbers can be placed around the measurement apparatus to reduce background radiation.

Source Versus Background

Often there is a need to search for particular sources of radiation in situations where there exist other similar sources of radiation generally referred to a background radiation which may be larger (sometime much larger) than to radiation from the particular sources. Most radiation instruments also will register a relatively small amount of false signals referred to a noise which needs to be accounted for in determining the sought-after radiation from the particular source. One technique is to (if feasible) measure the background radiation and noise when the source is known to not be present. When the source is present, the technique is to measure the total indicated radiation and subtract the background and noise to determine the radiation from the source.

The Need

What is needed is a technique for determining the intensity of a source of radiation in the presence of relative large background radiation.

SUMMARY OF THE INVENTION

The present invention in its simplest and most fundamental manifestation utilizes at least one pair of hodoscope radiation monitors arranged to simultaneously monitor a single region that contains a particular suspected source of radiation. The hodoscopes are preferably arranged so that their respective fields of view of the region are as close to orthogonal as feasible. The fields of view (FoV) of the two detectors will converge in an overlap region that contains the suspected source of radiation. Each of the two detectors will record radiation from the overlap region and in addition will record background radiation emanating from other regions within the respective fields of view of the detectors. The present invention provides for the appropriate data recording and use of mathematical correlation techniques to estimate the extent to which a radiation source originates in the overlap region. The present invention also applies to situations where the detectors sense ambient radiation that reaches the detectors from outside the collimated beam of source and background radiation.

As a simple example, the radiation detected by the two detectors may be recorded in counts per interval for a series of intervals. The radiation may then be detected as counts per 10-second interval for twenty 10-second intervals and these counts per 10 seconds are compared utilizing a mathematical correlation algorithm technique. A preferred statistical algorithm uses a known analysis of covariance means, called an Ftest, in which the variance for each of the twenty 10-second intervals is determined for each detector for each of the twenty 10-second intervals. Applicant has determined with actual test that radiation originating in an overlap region in the fields of views of two orthogonally arranged radiation detectors will result in substantially higher Ftest values and that radiation originating in non-overlap regions will result in substantially lower Ftest. Therefore, in preferred embodiments, Applicant calculated for each examination the comparative Ftest (and other statistical properties) of the data from the two detectors and found the Ftest to be the best indicator of the source in the presence of background, especially and including when the background rate was contemporaneously large with respect to the source rate.

Preferred radiation-monitoring diagnostic hodoscopes are adapted to detect gamma or neutron or gamma and neutron radiation in a limited radiation beam of less than 50 degrees defining a field of view. They should be positioned so that their beams overlap in a region containing all or a part of the target location. The computer processor is programmed with an algorithm adapted examine the data recorded by the at least two hodoscope units so as to determine the correlation of the recorded data so as to estimate the extent to which the radiation source or sources originate in the overlap region. Preferably the fields of view are orthogonal or approximately orthogonal to each other. If not orthogonal, the fields of view of each unit in each pair of units define a center line and the center lines define an angle, originating at a central location in the target region, of less than 30 degrees.

DETAILED DESCRIPTION OF PREFERRED EMBODIMENTS

First Preferred Embodiment

A first preferred embodiment of the present invention (which is referred to herein as the hodoscope orthogonal correlation (HOC) method) is described below with reference to the FIGS. 1 through 4. The underlying technical analysis is intended to explain the hodoscope orthogonal positional-correlation detection method, as well as to assist recognition of its inherent benefits compared to the traditional two-step background-subtraction radiation measurement procedure. Fundamentally, the positional-correlation method is a means of significantly improving detection of a radiation source S when a large background B of competing radiation is present. This is a common problem encountered in radiation detection and identification, that is, in radiation diagnostics.

The term "hodoscope" represents a radiation-detection system that because of radiation collimation has an effective limited field of view, and because the type of chosen sensing material has a detection capacity that might be deliberately limited to a single type and range of radiation, such as gamma rays. The simplest representation of this concept is through an independent pair of nearly identical collimated detectors, both of which are aimed at the same source.

Orthogonality is generally obtained by placing the pair of hodoscope detectors on the same plane, at right angles to each other, with the collimators directed at a radiation source common to their respective fields of view. The positional-correlation method, to be further defined and evaluated, is basically a specific means of collecting, processing, and analyzing data collected from the orthogonal hodoscope detectors.

The traditional two-step nuclear-measurement method for background subtraction might make use of a similar or identical pair of orthogonal hodoscope detectors; however, the pair is not ordinarily operated in the correlation mode. For the traditional two-step method, each detector unavoidably measures a combination of source and background, and then the background is subtracted after it is estimated or determined in a separate measurement. The net statistical confidence associated with determining the source strength can thus often be significantly degraded by the statistical impact of the background, especially when the background rate is large with respect to the source signal strength.

Figure 1:
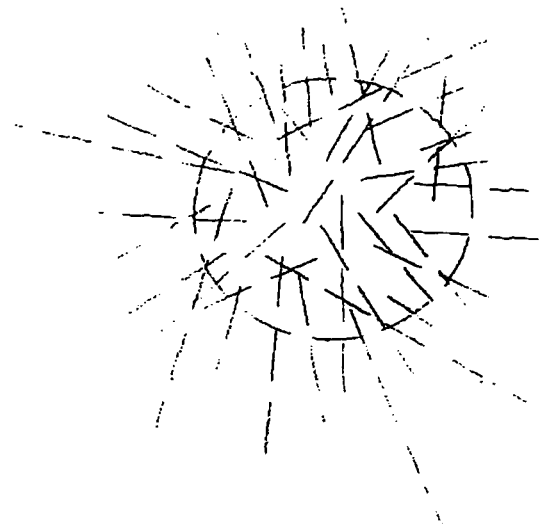
FIG. 1 is a symbolic pincushion representing a gamma source radiating in all directions.
Figure 2:
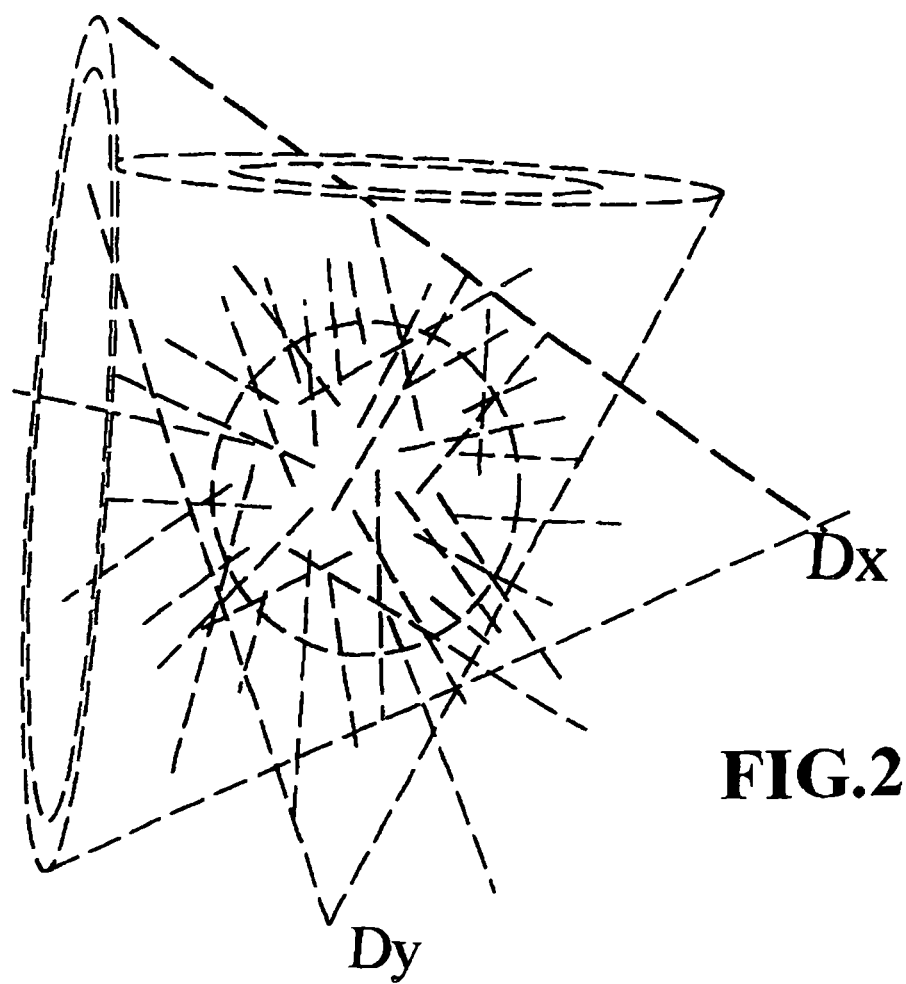
FIG. 2 shows features of preferred embodiments of the present invention.

An isolated radiation source is ordinarily emitting into $4\pi$ steradians, as depicted in FIG. 1, which schematically represents a time- and space-varying pincushion-type of random source emanation angles. If we position a pair of collimating detectors Dx and Dy to view the pincushion-type source, we could have the arrangement schematically illustrated in FIG. 2.

Figure 3:
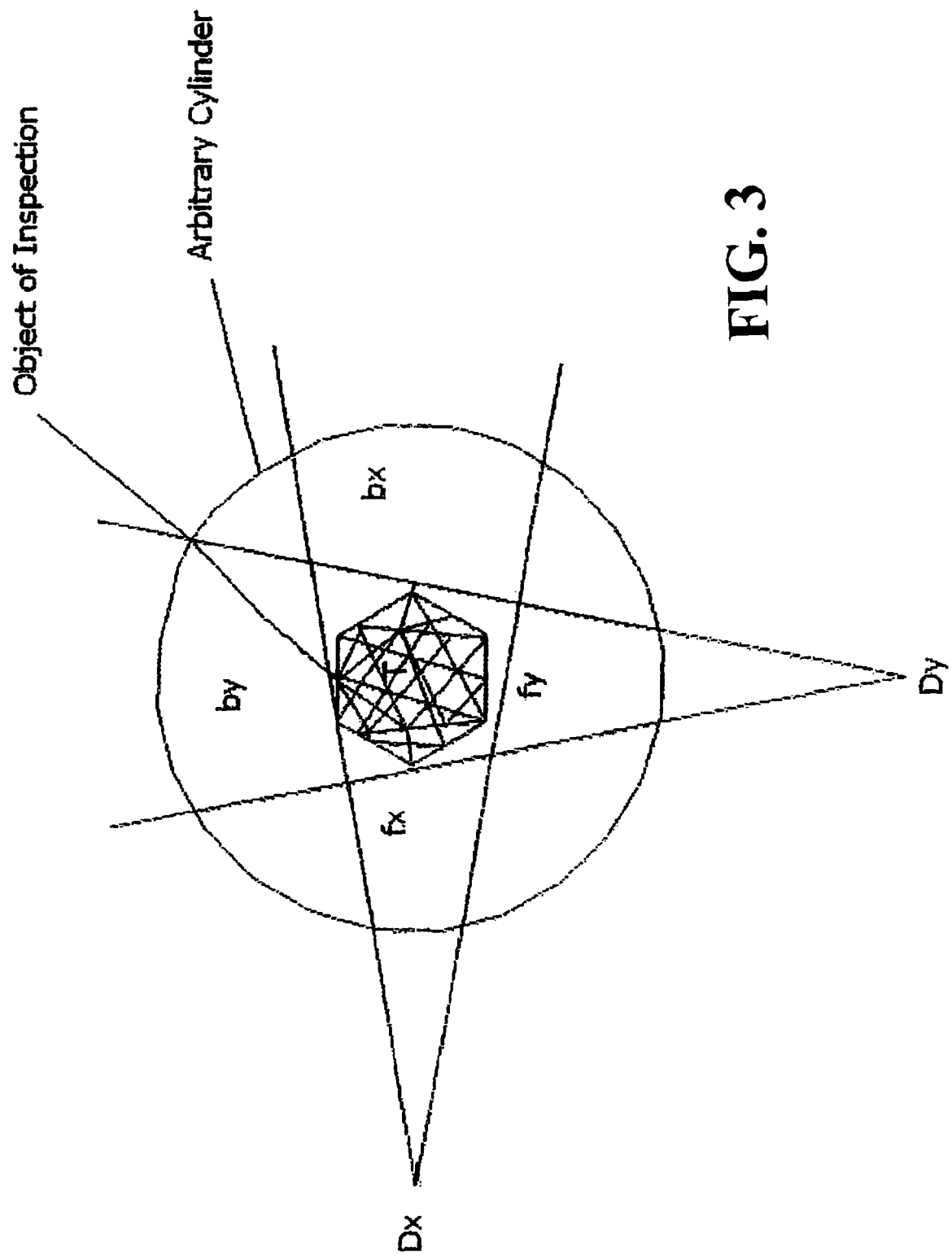
FIG. 3 represents a radioactive target in a region having foreground and background radiation.

The hodoscope orthogonal correlation method is further distinguished from the traditional two-step nuclear measurement process by using a sequence of orthogonally-paired collimated-detector measurements, as depicted in FIG. 3, analyzed by correlation analysis. In FIG. 3, the background observed in line of sight of the collimators is divided into two components, the foregrounds fx and fy and the backgrounds bx and by. For initial simplification, these are combined such that Bx=fx+bx and By=fy+by. Also in FIG. 3, the source is represented by a finite included cross-hatched area T. This recognizes that in some situations, the collimator angles might exceed the boundaries of the source area T.

Basic Formulation of Hodoscope Orthogonal Correlation Equations

The total (collimated+external) count in a HOC detector X or Y can be represented as follows:

$$Xi = \epsilon x \int \omega x (\alpha * \delta x * Si + Bxi)] + Nxi$$

$$Yi = \epsilon y \int \omega y (\beta * \delta y * Si + Byi)] + Nyi$$

where N represents the intrinsic noise+background of a detector extraneous to that viewed through the collimator. The subscript i represent each independent and sequential—usually contiguous and usually identical—count recording time interval. In any event, it is an interval common to recording data from both X and Y. The symbols $\delta x$ and $\delta y$ represent averaged attenuation (and relevant outscattering) effects that influence the transmission and detection of radiation in channels Xi and Yi. These effects are assumed here or postulated for the purposes of simplified relational analysis to be representable by integral terms that are independent of the native intensity for the common source Si. This assumption is a convenient simplified representation of integrals over space and time.

The combined quantities $\alpha \delta x Si$ and $\beta \delta y Si$ represents the subtended outflow of radiation received from a positionally correlated target source term Si that is common to the respective fields of view in both the X and Y detectors. The coefficients $\alpha$ and $\beta$ are related to the solid angle subtended by the collimated detectors. Only a fraction of the source emission flows into the respective field of view of the detectors, the remainder directed proportionately elsewhere, although subject to in-scattering from nearby materials. This incoming fraction within the separate collimators necessarily varies from instant to instant, but on average the detectors respectively view the fractions $<\alpha \delta x Si>$ and $<\beta \delta y Si>$ of the source average $<Si>$, assuming S emits isotropically in $4\pi$ steradians.

Depending on design parameters and manufacturing tolerances, $\alpha$ might equal $\beta$, but in any case the multiplication product with $\omega$ would represent intercept of a small fraction of the source intensity S. This latter assertion is fundamental to the hodoscope orthogonal correlation method: that is, a typical random radiation source emits isotropically on average into $4\pi$ steradians, although the portion flowing into the respective solid angles $\omega x$ and $\omega y$ varies from instant-to-instant. The intensity and spatial distribution of such a random radiation source is usually parametrically characterized by the mean value of a Poisson or Gaussian distribution in time and space. The coefficient $\alpha$ represents that fraction of the common source i which is subtended within the field of view of detector Xi—while $\beta$ represents the corresponding fraction of common source i which is subtended within the field of view of detector Yi.

If the intrinsic extraneous noise plus background component N is small with respect to all sources that come through the collimator, then:

$$Xi = \epsilon x \int \omega x (\alpha * \delta x * Si + Bxi)]$$

$$Yi = \epsilon y \int \omega y (\beta * \delta y * Si + Byi)]$$

and, if we set $kx = \epsilon x * \omega x$ and $ky = \epsilon y * \omega y$, then $$Xi = kx * (\alpha * \delta x * Si + Bxi)$$

$$Yi = ky * (\beta * \delta y * Si + Byi)$$

We use the simplifying parameters $kx = \epsilon(x) \omega(x)$ and $ky = \epsilon(y) \omega(y)$, where it is understood that these are energy and rate dependent to the extent recognized above, but are otherwise not correlated with the source and background being measured. We defined kx and ky such that $\omega$ takes into account the solid angle that the hodoscope collimator defines for each detector. However, if we have a point source, the collimator fully encompasses the subtended solid angle.

If quantitative assessment of the source were sought, by direct detection, these extraneous effects would have to be taken into account: Avoiding the necessity of directly determining these extraneous effects is a major advantage of the present invention covariance method (the first advantage being the qualitative separation of signal from a strong background, this other advantage being its relative independence of the effect of intervening materials. For a special case of a point source of spontaneous emission, we could represent the source term Si by vi Si, for each interval i.

Overlapping Source and Background

Figure 4:
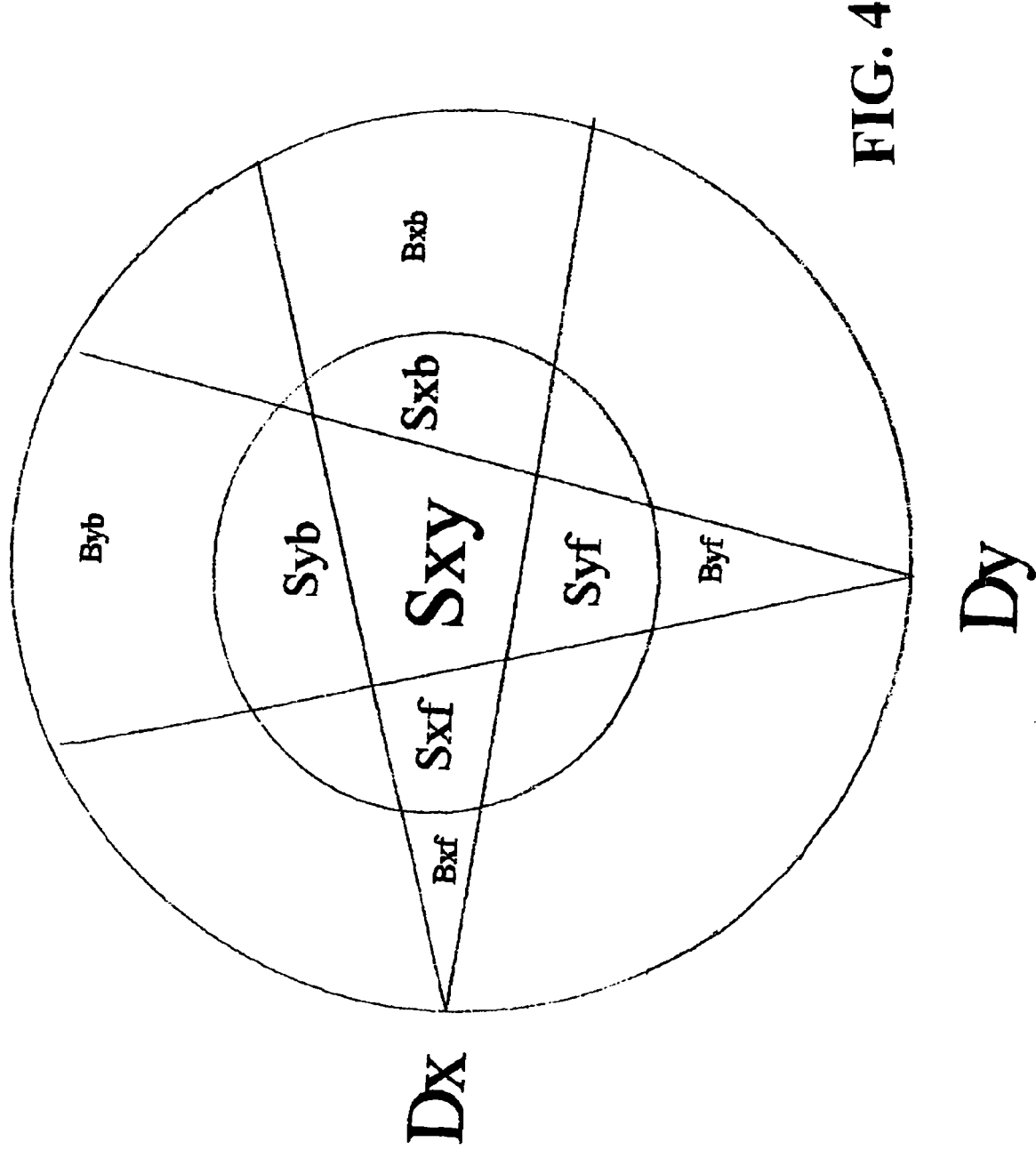
FIG. 4 shows a situation where the overlap of the fields of view of a orthogonal hodoscope array is smaller than the radioactive source being investigated.

As shown in FIG. 4 it is quite possible that the detectors will view overlapping source and background contributions. In that case, we write:

$$Dx = kx * (Bxf + Sxf + Sxy + Sxb + Bxb)$$

$$Dy = ky * (Byf + Syf + Sxy + Syb + Byb)$$

which can be measured for each ith interval and for a series of N intervals, such that i=1,N.

For the purposes of correlation analysis, only Sxy is common to both detectors. The Sxf, Sxb, Syf, Syb do indeed represent a portion of what we call the "source," as geometrically distinguished from the "background" components Bxf, Bxb, Byf, and Byb. However, the correlation-analysis treatment will only recognize the Sxy commonality, excluding all the remaining components of source and background from the correlation. Note that the source volume (or area subtended by a source that has a spatial extent on the x,y plane for this diagram) is definable by rotating or otherwise scanning the detector pair or complementary pairs of detectors. This process of scanning represents a normal operating and calibration mode for a hodoscope system.

For an extended (areal) source S, we could write:

$$X = kx * [Bxf + Sxy (1 + cxf + cxb) + Bxb]$$

$$Y = ky * [Byf + Sxy (1 + cyf + cyb) + Byb]$$

where the coefficients cxf, cxb, cyf, and cyb represent overlapping fractions of an extended source. Moreover, for practical purposes, we could simplify further:

$$X = kx * [Bx + (1 + cx) * Sxy] = kx * [Bx + (1 + cx) * S]$$

$$Y = ky * [By + (1 + cy) * Sxy] = ky * [By + (1 + cy) * S].$$

As a result, the correlation will be modulated by the extent by which each detector subsumes the common source S. If the solid angle of each detector happens to be large enough to subsume the entire source, then cx and cy both approach zero. Of course, realistically, the source will be non-uniform, so the coefficients c represent a simplified rendering of a complex situation. Inasmuch as source non-uniformity will take the form of both density and volumetric variations, the correlation coefficient will have to be interpreted as a single-parameter representation of a likely complicated geometric and qualitiative measure of radiation originating from the "source" region.

Monitoring Damaged Nuclear Reactors

Figure 5:
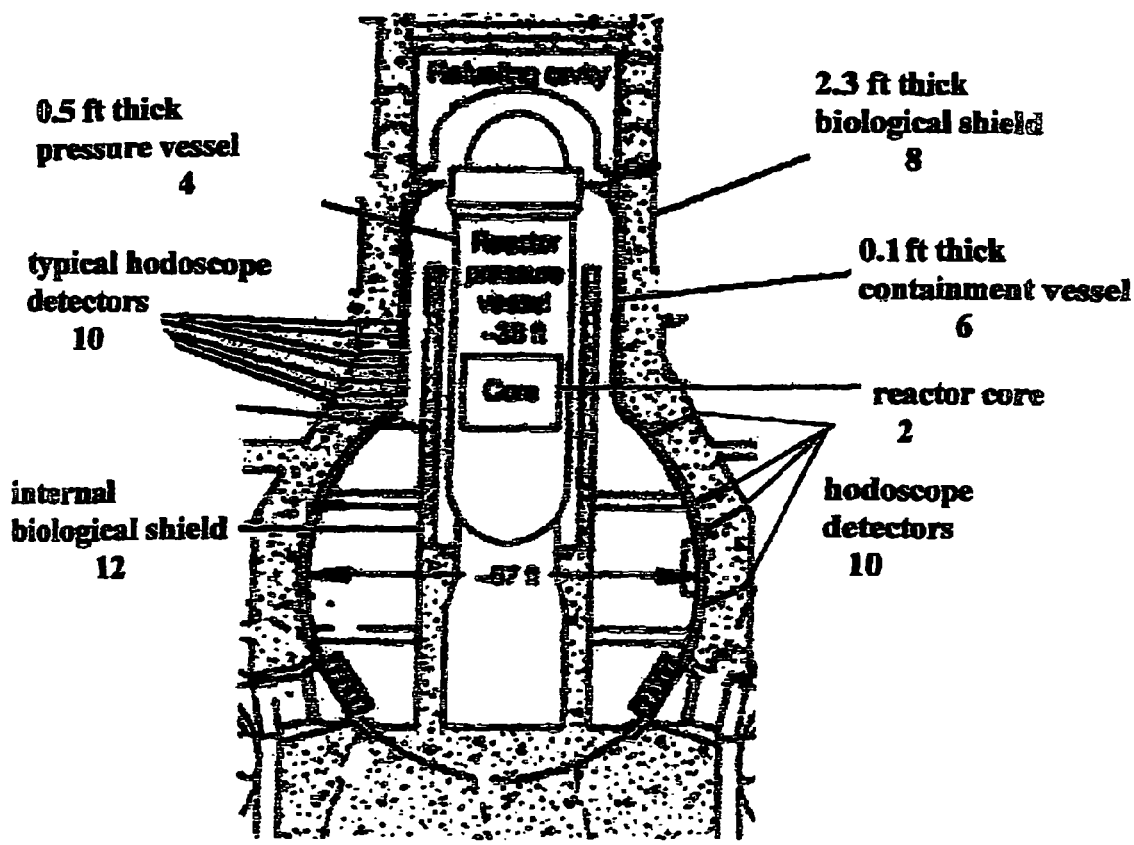
FIG. 5 is an elevation cutaway sketch of a Fukushima-type boiling water reactor, indicating features significant to this invention.

In such situations where background is likely to provide strong interference with measurement of specific properties, the correlation coefficient is of considerable value. This would be the case expected in determining fuel re-concentration within the now-disabled Fukushima reactors, where linear relationships between measured results and actual "fuel" density would be difficult to quantify, and where a large overwhelming background is present. Fundamentally, certain geometrically-correlated features of the reactor that constitute background (such as the pressure vessel and the biological shield—see FIG. 5) present radiation background sources that are relatively uniform or slowly varying in spatial extent and radiation emission. Thus, the isolated structure and density concentrations found within the pressure vessel or biological containment are more likely correlated with the original core or its redistributed debris. FIG. 5 is included herein simply as a reminder that this HOC concept was originated by the desire to improve signal/background criteria in attempting to measure fuel reconcentration in the impacted Fukushima BWRs. Substantial background is created by and within the structure, including the pressure vessel and the biological shield, such that it would interfere significantly with the desired recognition of clusters of original or reconcentrated fuel within the reactor (and within the biological shield). It appears that the HOC method would offer several orders of magnitude improvement in SB measurements, which are sufficient to differentiate fuel in a large radiation background (that is, determination of the signal rate S is not needed per se).

Estimating Count Rates from Radiation Sources

Count rates from radioactive sources can be estimated for specific detection geometries and efficiencies, and these rates and their role in this HOC model can be quantified. For computational purposes, using proprietary GQ GMC hardware and software, the following approximations can be used: A Curie is a unit for quantification of a radioactive source emission rate, such that 1 Ci=$3.7 \times 10^{10}$ decays per second (1 Bq=1 decay/s), and 1 μCi=$3.7 \times 10^{4}$ disintegrations per second=$2.22 \times 10^{6}$ disintegrations per minute.

The following values of efficiencies and solid angles were found to be approximately suitable for a pair of commercially available GQ GMC radiation detectors in which a smaller Geiger Muller tube (purchased from the Ukraine) was substituted:

$$\omega x=0.1300 \; \epsilon x=0.01800 \; \omega y=0.0840 \; \epsilon y=0.03300$$

$$kx=\epsilon x^{*}\omega x=0.0054 \text{ and } ky=\epsilon y^{*}\omega y=0.0028$$

Typical background rates were found to be 7.3 and 3.1 cpm, respectively.

For a simulation that does not involve source attenuation and out-scattering, the corresponding terms δx and δy go to zero, and our previous relevant equations simplify to:

$$Xi=kx^{*}(\alpha^{*}Si+Bxi)$$

$$Yi=ky^{*}(\beta^{*}Si+Byi)$$

Furthermore, the coefficients α and β related to the solid angle subtended by the collimated detectors can be considered to be equal to each other, at least depending on the placement of sources. In practical effect, the counts collected in detectors X and Y are proportional to a term involving a common source term Si and an added background term that differs for each detector, resulting in a pair of linear equations of the form a+bS.

The efficiency factors k are relatively small, but it matters mostly in terms of the statistical outcome of the relative relationship between source, background, and detectors. This relationship has been found to be adequate for obtaining statistically useful results in practical experiments using radioactive sources and small GM detectors, with data collected in 1-minute intervals, for time periods in the time frame of hours.

Spreadsheet tabulation of the data collected has proven to be consistent with Monte Carlo simulations of the input data as transformed according to the indicated HOC model.

Computer Modeling Conditions

Computer modeling of radiation sources used in the HOC process must adhere to physical constraints, such as those influenced by the characteristics of the source. As far as radioactive source emanation is concerned, modeling must take into account two separate physical processes. First, a "passive" radioactive source—assuming a point geometry—is spontaneously emitting at a rate characterized by its radiative nature, in particular its half-life. This source term is ordinarily approximated with a gaussian distribution about the instantaneous mean emission rate. Thus, the instantaneous emission rate for any given time interval is the same for all observing detectors.

For most measurements and simulations, we normally deal with sources for which the mean value does not change significantly during the measurement interval, even though the instantaneous rate varies with a standard Gaussian distribution. Thus, we characterize the integral source rate at some arbitrary time t with some instantaneous value that is an integral over the measurement interval i. The second feature that should be independently modeled is the instantaneous spatial distribution of the source with a value centered about its mean emission rate. At any given instant, each solid angle will contain radiative emission proportionate to its subtended solid angle, but instantaneously variable in time such that the integral over 4π emission will equal the instantaneous time average for the ith measurement interval. This would be represented by some fraction of the instantaneous mean emission rate as distributed about the 4π distribution. This, in modeling, thus represents a second randomization process within the subtended solid angle (which ordinarily will be a small fraction of 4π).

The source strength during a single ith time interval is thereupon represented by the product of its ith mean value and its ith solid angle. The ith mean value is normally a gaussian distribution about its mean value, and the ith solid angle is likewise a gaussian distribution representing a subset of the mean value during the same ith interval. If not a point geometry, suitable approximations might be needed for modeling purposes.

Computer Monte Carlo Simulation Results

Correlation values were computationally simulated using a multi-parameter computer program, such that various parameters were randomized and the assumed source value was simulated with a Gaussian (normal) distribution. Despite wide variations in the operative parameters and the variable source intensity the randomized systematic results confirm that a pair of detectors would provide under stable theoretical conditions a statistically reliable result even with a background/signal ratio of 1000 or more. In contrast to any other detection method, the HOC dual-channel method appears able to detect a very small correlated signal within the field of view of a pair of collimated detectors despite an otherwise overwhelming background of similar radiation in the same field of view.

Passive, Active and Scatter Systems

Hodoscopes as described above detect radiation within their field of view which field of view is determined by the design of the hodoscope. The radiation may be passive, active or scatter radiation. This HOC invention applies to each type of radiation source.

Passive

The first preferred embodiment has been described as if the radiation being monitored (i.e. radiation from the overlap region as well as other radiation originating outside the overlap region but within the field of view of the detectors) is the result of natural decay of radioactive nuclei within the field of view of the detectors. Applicant refers to this type of arrangement as a "passive" arrangement.

Active

In some cases especially when an objective is to search for special nuclear material an "active" arrangement may be utilized. In such an arrangement an object suspected of possibly containing special nuclear material could be irradiated, for example, with one or more neutron beams. If the container does hold special nuclear material some of the atoms of the special nuclear material would absorb neutrons and as a consequence would fission releasing gamma rays and additional neutrons each of which could be detected by the orthogonally arranged hodoscopes as shown in FIGS. 1 through 4.

Scatter

Another possible utilization of the present invention is in a radiation-scattering situation. In this case, a container would be irradiated with a source of penetrating radiation, such as gamma radiation or neutron radiation. This penetrating radiation (gamma or neutron) would be absorbed or scattered from the contents of the container and the orthogonally arranged hodoscopes of the present invention could monitor the scattered radiation. The orthogonally arranged hodoscopes could be scanned relative to the container or the container could be scanned relative to the hodoscopes. In either case a reconstructed image of certain contents of the container could be determined from the collected data.

Additional Considerations

Aside from the assumptions made inherent in the use of single parameters to represent effects that should be integrated over various variables, there are a number of identifiable and probably unidentified considerations. One of these relates to limitations of typical detection systems, for example deadtime and multipulsing effects, that are found to be factors particularly in GM tubes and associated electrons. Moreover, these effects differ for each detector. Workarounds include exclusion of anomalous data that are clearly associated with multipulsing, and the observation that these effects are secondary or tend to cancel out when the data from two similar detection systems are being compared in a statistical correlation process.

Another refinement would be associated with each specific type of background (e.g. foreground, background, ambient). Each would have its own efficiency for detection, depending very much on its average energy. The role of overlapping coverage of collimators has already been mentioned, and with a good geometric model, the overlap could be unraveled. However, in simply asking for a degree of correlation to be extracted from a series of measurements, this overlap can usually be deduced in part by scanning detectors vertically and horizontally.

In connection with real-world situations, there are two extremes in experimental geometry related to the HOC method: collimated and uncollimated. It is possible, on one extreme, to have a pair of uncollimated detectors receiving counts from a point source; and, on the other extreme, to have an extended source and background within the field of view such that it requires narrow and effective collimation.

Summary of HOC Radiation Detection Data

Based on actual ("passive") radiation measurements taken with a pair of commercial GMC Geiger-Muller detectors, usually arranged orthogonally, with appropriate shielding as needed, certain simplified conclusions can be confirmed. Almost all data conforms to the HOC theoretical model, as presented above. The (only) proven useful statistical metric is the Ftest, which primarily analyzes a ratio of variances. HOC values as presented by the experimental data conform quite closely to expectations: that is, when a common "source" is presented, the Ftest (@Ftest spreadsheet function) values are relatively high, approaching 1, and when there is no common "source," the Ftest values approach zero.

These results have been obtained with rather good consistency for ambient background measurements, for a variety of common sources (Co-60, Cs-137, Ba-133, Na-22, Cd-109, and U-238), and for a variety of HOC source combinations. The detection data has better adherence to the theoretical HOC model summarized in this paper than do the Monte Carlo random-walk computations modeled for the HOC process. The model-generated results fail to show Ftest values approaching zero when there is no common source, even when experimental data replaces artificially-generated Gaussian-distributed input data. The discrepancy noted in this paragraph is the only discrepancy noted in the MC computations.

The detection data has been varied in count rate, count ratios, signal/background ratio, and other properties in order to generate a substantial data base. For reasons apparently related with the conditions of derivation, the Pearson's covariance (@correl spreadsheet function) fails to track the changes that take place with the experimental data, and to some extent with the computer-generated data. Moreover, other statistics (such the Dtest, Ttest, and the Ztest) have not proven to yield useful results. In addition, applications of @Ftest and @Correl to autocorrelation have resulted in null values, which is consistent with the assumptions of the model.

Preferred First Embodiment: Single-Channel Hodoscope

Figure 6A:
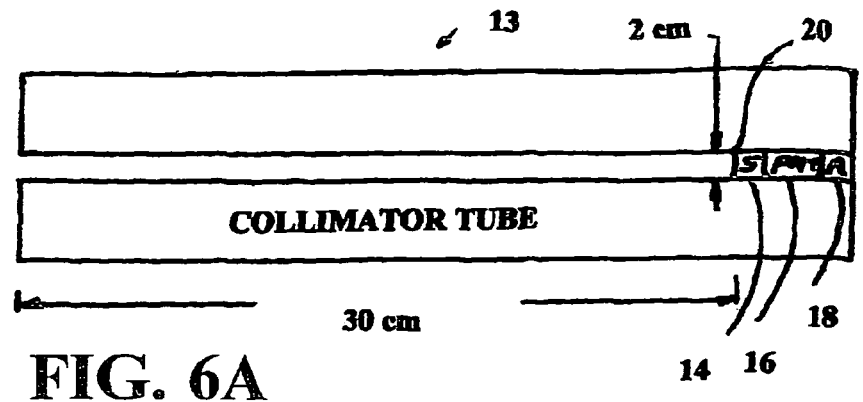
FIGS. 6A and 6B are drawings of a single-channel hodoscope that is illustrated with a tungsten-tube collimator.
Figure 6B:
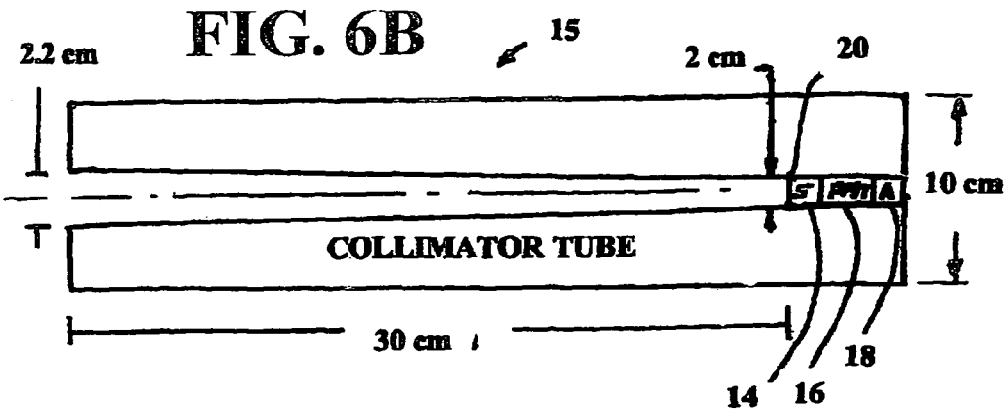

FIGS. 6A and 6B show some essential features of two versions (13 in FIGS. 6A and 15 in FIG. 6B) of a single-channel hodoscope that could be used in the present invention. The FIG. 6A version includes a thick, long tungsten (lead or steel could be substituted) collimating tube having a 2-cm channel drilled through the center of the tube. At the end of the tube is installed an off-the-shelf gamma scintillation detector, such as Model 943-37 available from Fluke Biomedical with offices in Everett, Wash. This model is 5 cm in diameter and includes a 5-cm long sodium iodide (NaI) crystal 14, a photomultiplier tube assembly 16 and a preamplifier 18. Mounted in front of the detector might be a thin lead and/or cadmium filter, the position of which is shown at 20, used to block low-energy neutrons and/or gamma-ray background. This channel limits the field of view of this specific hodoscope collimator to about 4 degrees. In the unit shown in FIG. 2B, the collimating channel is tapered to provide a field of view of slightly more than 6 degrees. Preferably the field of view of the single-channel hodoscope should be kept within 10 degrees. In some preferred embodiments the field of view could be restricted to less than 4 degrees as shown in FIG. 6A by making the channel longer or tapering the channel in a direction opposite that shown in FIG. 6B.

Both Co-60 and Cs-137 radioactive isotopes are expected to contribute significantly to the radiation emitted from a reactor core that has been shut down for about two years. In preferred embodiments it would be important to be able to distinguish the radiation produced by such sources so as to determine where the fission products are located as a strong indication of the location of the reactor core materials.

Figure 6C:
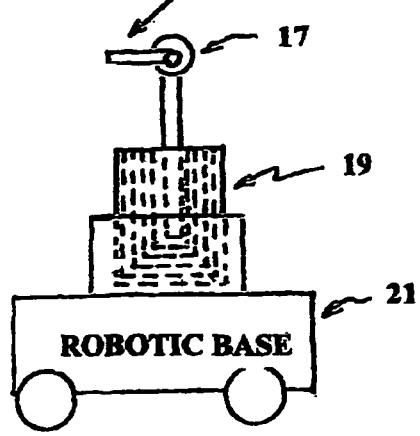
FIG. 6C shows a mobile-hodoscope mounted on a robotic transport system.
Figure 7:
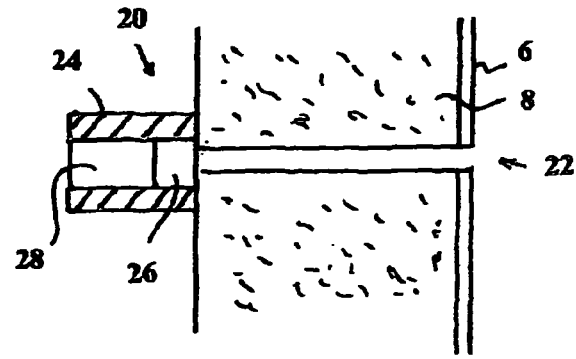
FIG. 7 is a side view of a typical embedded-hodoscope detector of the present invention that would be paired with an orthogonal embedded-hodoscope detector.

A single-channel hodoscope of the type described above—if used in very high radiation environments—could be utilized as a part of an HOC-paired robotic system. An example from the parent application is shown in FIG. 6C. This system includes the single-channel or multi-channel hodoscope 13 or 15, a two-axis gimbal 17 for pointing the hodoscope 360 degrees in horizontal and about 120 degrees in elevation, a telescoping support 19 to position the gimbal vertically, and the above components are mounted on a robotic base 21. All of these components should be designed to be remotely controlled. In preferred embodiments a camera and a visible light source (not shown) could be bore-mounted on the hodoscope so that visible images of the reactor structures can be recorded simultaneously with the radiation data. For embodiments of the present invention two separate robots could be used to provide the overlapping of fields of view.

Alternative Gamma Detectors

A large variety of gamma ray detectors are available off-the-shelf that can be utilized in hodoscopes as described above, These include scintillator detectors of various types including the NaI detectors as described in detail. These detectors typically include a photomultiplier tube or a photodiode that absorbs light emitted by the scintillator and reemits in the form of electrons via the photoelectric effect. An alternative to the photomultiplier tube is the relatively new single-photon silicon photomultiplier (SPM) detectors. These devices convert the light from the scintillator to electrical pulses without amplification electronics. One advantage of these devices is that they do not require high voltages. Semiconductor detectors of various types can also be used in the hodoscopes. Many of these detectors are available off-the-shelf. As explained in the Background section, high-purity germanium detectors provide much better resolution than the NaI detectors, but are much more expensive and require cooling (typically with liquid nitrogen).

Specific Applications of the Present Invention

Applications of the present invention as stated above fall into three categories. These are passive, active, and scattering. Passive arrangements provide improved means of non-destructive determination of coolant-water level and core-fuel distribution or redistribution in such reactors, as well as an improved means for detection of any type of self-emissive (passive) radiation source, by the use of the hodoscope orthogonal-correlation (HOC) passive-mode methodology. Active arrangements of this invention is specific to the detection of uncontrolled or illicit substances that endanger public and government security and safety include unauthorized explosives, nuclear materials, hazardous chemicals, illegal contraband, and prohibited drugs, by the use of the HOC active-mode methodology. Scattering-mode arrangements of this invention are specific to the detection of substances similar to the active arrangements, but are based on a scattering-mode methodology. Provided below are additional details of each of these three applications of the present invention:

Technology for Detecting Passive Radiation Sources

The traumatic events that followed the 2011 earthquakes and tsunamis in Japan have revitalized interest in nuclear-reactor instrumentation which might minimize reactor accidents and their consequence. Three reactors at the Fukushima Dai-ichi nuclear-power station were irreparably damaged and remain under stressful conditions that could yet result in further internal damage or danger to remediation personnel. In any event, those reactors are to be eventually decommissioned, expectedly in a safe, orderly, and timely manner. The parent patent application which has been incorporated by reference herein provides a detailed discussion of the Fukushima reactors and techniques for utilizing hodoscopes for examining the damaged reactor. Described below are preferred techniques for applying the correlation concepts of the present invention to the radiation monitoring situations such as the situation currently being experienced at the Fukushima station and other similar situations as they may arise.

The present invention applies specifically not only to the Fukushima Dai-Ichi boiling-water nuclear reactors, but also to other reactors around the world, as well as to other types of water-cooled power reactors. The difficulties and malfunctions experienced at the Fukushima Dai-Ichi nuclear-reactor station as an aftermath of the 2011 earthquake and tsunami illustrated the need for radiation-monitoring diagnostic hodoscope system in order to (1) prevent or minimize further harmful damage to the damaged reactors, (2) assist the safe and economic decommissioning of the damaged reactors, and (3) assist in the orderly restart of the undamaged reactors.

The correlation concepts of the present invention could be applied to supplement those specifically described in the parent applicant to significantly improve sensitivity to fuel reconcentration.

There are two specific embodiments of this radiation-monitoring multichannel diagnostic hodoscope invention, as referred to in applicant's 2012 Fukushima Hodoscope Provisional Patent Application. The first embodiment is in the form of an array of gamma-ray detectors embedded in the reactor biological shield; this embodiment will be called an embedded hodoscope. The second embodiment is in the form of a movable array of gamma-ray detectors that can be moved into and remotely operated within the reactor containment building; this embodiment will be called a movable hodoscope. Either of these embodiments could be expanded, positioned, and processed in such a manner as to be compliant with the HOC requirement.

Because measurements made by a movable hodoscope detector array are made simultaneously by all detector channels, it is possible to create overlapping data results through a horizontal and/or vertical scanning operation that self-calibrates the array, making it possible to achieve spatial resolution much better than the inter-channel spacing between collimated detectors. This principle, observed routinely with apparatus constructed using the principles of the 1978 Hodoscope Patent, is of profound importance in application of this invention for the unusual conditions that exist in a reactor that has been shut down but provides an otherwise hazardous environment for human beings. Operation in this manner is consistent with the requirements and benefit of this present HOC invention.

The simplest embodiment of the present invention would consist of at least two hodoscope collimated detectors, similar or not in type or detection mode, that are arranged orthogonally and aimed at a common "source" region, wherein the data-response functions of each detector would overlap at the "source." The source might consist of a form of radioactive emanation that spontaneously and randomly emits radiation sensed in two or more of the HOC detectors during simultaneous time intervals.

A more complex embodiment consists of more than one radiation source, accompanied by one or more forms of radiation-like background that conflicts with quantitative estimation of the emissive strength of the radiation source or sources. An example of the more complex embodiment would be the situation that is presented in applicant's Fukushima Hodoscope Patent application, in which the source of radiation is within the confines of a nuclear reactor, wherein some of that radiation is defined as a "source" term and the undesired remainder is considered the "background."

As in the case of applicant's parent application, there are two separate and complementary embodiments of this present invention depending on the degree of access available in the reactor building. Either of these manifestations enable external diagnostic interpretation simultaneously of both fuel and coolant configuration or reconfiguration resulting from an accident. These embodiments are the embedded and the movable hodoscopes of applicant's Fukushima Hodoscope Patent, but they could be aligned and operated specifically in a mode that provides correlation of orthogonal data.

An embedded hodoscope system could be positioned entirely external of the pressure boundaries of the reactor vessel. In an HOC mode, the system should thus also have great durability and be immune from destruction or inoperative condition caused by deliberate or uncontrolled water level changes, reactor-core overheating, or internal reactor-fuel redistribution. It should also be self-actuated and have independent internal electrical-power sources. Calibration and inter-calibration of all HOC embodiments would be accomplished as in the case of applicant's parent application. Resolution and sensitivity is expected to be significantly improved when the HOC embodiment is functional.

HOC electronic modules and signal processing for each hodoscope detector should be designed to provide a wide dynamic range, have designed redundancy, be capable of high radiation endurance, and have independent backup power in case of system-wide electrical-supply loss. It is expected that water-level, fuel-reconcentration, and process-variable sensitivity will be improved by the HOC arrangement. In addition, the detectors would be qualified to operate under the harsh conditions that exist within the reactor biological shield. The HOC technology can be installed, adapted, or modified for instrumentation that has been previously installed, or it could still be implemented at Fukushima, as well as in similar water-cooled nuclear-power reactors before they too might suffer similar malfunctions.

The present invention makes possible comparative diagnostic analysis of radiation-monitoring hodoscope gamma-detector data is capable of identifying in an operating reactor radical changes from the normal condition. There presently is substantial lingering uncertainty regarding the damaged Fukushima reactors, that is, as to the height, location, and concentration of water coolant in the reactor pressure vessel and in its external containment vessel. At the same time, there is considerable and crucial safety-related uncertainty as to the distribution or redistribution of fuel and structural components in the damaged Fukushima reactor core and pressure vessels. Obtaining detailed actionable knowledge of these factors through the HOC invention could be extremely important to the safety, cost, procedures, and duration of decommissioning the tsunami-affected reactors.

Application of the present invention specifically to the detection of fuel and water concentrations in shutdown nuclear reactors represents a significantly sensitivity improvement compared to applicant's parent application. This HOC Patent includes an external radiation-monitoring diagnostic hodoscope system for determining water-coolant levels and reactor-fuel concentrations in various regions of a water-cooled nuclear power reactors after the reactor is shut down. Specifically the present invention can be applied for detecting vertical and horizontal changes in the density of the liquid and fuel within the shutdown reactor. In the simplest embodiment of this invention, a pair of hodoscope correlation detectors is positioned outside the reactor biological shield at orthogonal angles aimed at the central region of the reactor pressure vessel in order to determine the location of either unaffected or redistributed nuclear fuel. These orthogonal hodoscope detector pairs may be deliberately repositioned at different elevations in order to compare respective results and thus determine the water-level transition.

Residual radiation from and scattered in or around the fuel, structure, and water provide a means of detecting and distinguishing major changes in distribution of the distinguishable materials. In another manifestation of the invention, a multiplicity of gamma-radiation detectors is installed, arranged vertically and radially inside or outside the secondary concrete shield wall in a fixed-position embedded system, but operated as detectors for the purposes of improved sensitivity after reactor shutdown. Collimation provided for each detector limits the gamma-radiation it receives as emitting primarily from isolated regions within the reactor vessel.

Comparative analysis of adjacent HOC detectors senses penetrating-radiation changes from the normal condition to advise of changes in the presence and/or density of reactor fuel and/or coolant at these specific regions. The detectors can also sense the distribution or redistribution of core fuel and some structural constituents with greatly improved sensitivity compared to other radiation-detection methods. Most important is that these detectors operate in the mixed radiation field remaining weeks, months, and years after shutdown.

A movable radiation-monitoring diagnostic hodoscope array operating in the HOC mode can be utilized in the crippled boiling-water reactors at Fukushima and at commercial water-cooled reactors after shutdown. A previously-embedded array of HOC detectors can have their signal processing electronics modified for operation in the correlation mode. This would take the form of installed pre-positioned and functional backup instrumentation for determining and monitoring the configuration or reconfiguration of coolant and fuel inside a reactor pressure vessel after accidental or emergency shutdown of a boiling or pressurized water-cooled nuclear reactor.

Advantages of Correlation Techniques

The primary observation to be taken from the HOC methodology is the use of statistical methods to derive information that is otherwise difficult to extract. This invention embodiment is based on the orthogonal physical arrangement of at least two radiation detectors, both focused on a common correlated feature. It therefore because possible to treat the accumulated data stream in such a manner as to derive mutually-correlated properties, in contrast to being overwhelmed with background data that otherwise obscures the desired correlation. Once satisfactory detector operating parameters are determined, using traditional hodoscope diagnostic methods, it might become possible to use pairs or arrays of much smaller detectors for the HOC method.

For situations in which radiation detectors would have already been installed in a manner similar to that proposed in applicant's 1987 Water-Monitoring Patent, the output signals from paired or multiplexed detectors could be processed in accordance with the requirements of this HOC invention. Doing so would allow the water-monitoring detectors to be used long after reactor shutdown for the purposes of monitoring fuel and water concentrations, which otherwise would not be feasible in the absence of this modification.

Depending on results of scoping experiments and calculations, the requisite signal data processing could proceed according to any of several available optimization choices, such as single-channel or multiple-channel pulse-height data recording. The accumulated data would be in the form of either electronic pulses or ionization current values.

Water-Level Detection at Fukushima

To determine the water-lever vertical interface, the HOC detectors of this invention would be mounted or moved so as to act as a vertical-displacement hodoscope with the results of at least two horizontal orthogonal-correlation detectors being compare at one or more vertical levels.

At a given elevation, we would have (above or below discontinuities) either the effects of water at one elevation compared to the effects of no water at another elevation. This would be reflected in an abrupt change in foreground and background.

The advantage of the HOC method is that it would enable detection of water levels under situations where applicant's Fukushima Hodoscope Patent technology would not have sufficient sensitivity.

Technology for Applying Active Radiation Sources

Uncontrolled or illicit substances that endanger public and government security and safety include unauthorized explosives, nuclear materials, hazardous chemicals, illegal contraband, and prohibited drugs. Detecting and identifying such dangerous or controlled substances has been the objective of many applied technologies, especially sensors based on nuclear radiation, including definitive radiographic methodology. For homeland security, particular emphasis has been on the detection of explosives at checkpoints, including airport portals and cargo transfer stations. For national security, high priority has been given to sensing unexploded ordnance, latent landmines, and chemical weapons. These hazardous materials and objects can be broadly categorized as substances of concern.

The concepts described in this section provides a new, more efficient and definitive means of detecting and identifying substances of concern, as well as potentially reducing unnecessary radiation exposures in nuclear diagnostics. The embodiments described herein is explicitly distinguished from prior art that is similar in methodology, as well as prior art that uses other means to achieve similar purposes. Only this invention provides a broad functional and efficient capability of specific-materials detection and identification of substances that have dangerous, forbidden, commercial, or other aspects that gain deliberate attention.

The external detection and identification of specified substances by the selective and novel use of nuclear technology is the general purpose of this invention. More explicitly, nuclear detection and identification of various dangerous and important substances are greatly enhanced by the means offered in this patent, namely HOC for active sources. The technology can be implemented by non-intrusive and non-invasive means consisting of two external specialized radiation detectors and one external radiation-generating source.

The public- and commercial-interest justification for application and originality of this invention is based on recognized public value for technologies to improve or ensure public security, safety, and health. This universal mandate embraces military operations, public transportation, energy production, and the general welfare and security. Uncontrolled or illicit substances that endanger public and government security and safety include unauthorized explosives, nuclear materials, hazardous chemicals, illegal contraband, and prohibited drugs.

Detecting and identifying such dangerous or controlled substances has been the objective of many applied technologies, especially sensors based on nuclear radiation, including definitive radiographic methodology. For homeland security, particular emphasis has been on the detection of explosives at checkpoints, including airport portals and cargo transfer stations. For national security, high priority has been given to sensing unexploded ordnance, latent landmines, and chemical weapons. These hazardous materials and objects can be broadly categorized as substances of public concern.

The concepts described herein provides a new, more efficient and definitive means of detecting substances of concern, as well as potentially reducing unnecessary radiation exposures in nuclear diagnostics. This invention can be explicitly distinguished from prior art that is similar in methodology, as well as prior art that uses other means to achieve similar purposes. Only this invention provides a broad functional capability of specific-materials detection and identification of substances that have dangerous, forbidden, commercial, or otherwise interesting aspects.

Specific substances of high public and government interest include chemical explosives and nuclear materials, as well as various forms of contraband and other illicit substances. For military applications, buried-mine detection, chemical weapons, and unexploded ordnance are important. For humanitarian purposes, unexploded mine and ordnance warrant a high level of attention. In terms of nuclear security, fissionable, fertile, and radioactive materials—especially if coupled with conventional explosives—are of prime concern for efficacious detection. Although substantial sums of money (billions of dollars) have been spent on improving substance detection and identification, prevailing or competing technology is either too time consuming, intrusive, complex, or has other fundamental limitations.

The detection hardware in this invention combines hodoscope collimation and detection techniques with a radiation source, while the data processing hardware in this invention makes use of classic data-correlation techniques. When the specified target is irradiated by a highly-penetrating neutron source (not necessarily pulsed), characteristic radiation is unavoidably emitted from the target. This approach makes use of substance identification by means of composition templates associated with specific chemical elements.

This method can make use of, or be used in connection with, essentially all forms of induced, transmissive, or scattered penetrating radiation (not just fast neutrons as an interrogation source, but also lower-energy neutrons, gamma rays, ultrasonic pulses, radar reflections, and other means of probing that might provide specific correlated identifying characteristics from the target zone).

Preferably a pair of detectors is arranged externally and orthogonally on a plane that is itself orthogonal to the active source.

The active-source HOC method enhances nuclear inelastic-scattering detection of chemical explosives that are rich in nitrogen compared to other elements. Because of its enhanced efficiency for characterizing radiation, it is possible to use comparatively weak-intensity neutron radiation sources. This method would allow efficient determination of the relative quantities of nitrogen, oxygen, and hydrogen by distinguishing inelastic fast-neutron scattering reactions that are specific to explosives. National-security application of interrogation techniques such as the active-source HOC method are of considerable value for detecting special nuclear material, for enhancing domestic and international nuclear safeguards, for reinforcing nuclear nonproliferation, and for improving homeland security.

In active interrogation systems, external neutron or gamma ray sources are often used to induce fission or other nuclear reactions in the threat substance, and appropriate radiation detectors are used to measure characteristic emissions. The data derived from these detectors are subsequently analyzed to identify unique features that can be used to detect, identify, and characterize the threat material. Passive detection techniques can sometimes unveil illicit trafficking of radioactive material. The HOC method in either the active or passive mode includes appropriate data processing and mathematical algorithms aimed at improving both the sensitivity of the systems and their effectiveness in discriminating false positives and nuisance alarms.

The implementation of an active-source HOC is based on a combination of theoretical and experimental results, as well as new analysis capabilities in the form of improved algorithms, so as to provide more efficient and accurate determinations of substance composition.

Because detection and localization of radiation is improved in active-source HOC, this method can be applied to medical radiography and other related fields of radiography where radiation sources are normally used. This method should reduce the radiation dose absorbed, and as well as incidental doses involved in handling radiation sources. Because dose localization can be improved, reduced doses could result from diagnostic testing, imaging, and treatment with medical radiation beams.

Correlation

According to the present invention no less than two hodoscope collimated detectors are operated as mutually independent by observing an overlapping target area from different angles, even if not at right angles from each other on any given plane. The one-or-more-collimated-radiation-detectors would preferably be oriented at 90-degrees to each other on a single spatial plane. Correlation refers to a broad class of statistical relationships that involve functional dependence. A correlation coefficient commonly refers to the Pearson product-moment correlation coefficient, a measure of the strength and tendency of the linear relationship between two variables that is defined in terms of the (sample) covariance of the variables divided by their (sample) standard deviations. Pearson's correlation coefficient, the most familiar measure of dependence between two quantities, is obtained by dividing the covariance of the two variables by the product of their standard deviations. In practice, the Ftest measure of statistical correlation has been found to be systematically more useful as an indicator of HOC values.

In practice, the one-or-more-collimated-radiation-detectors for an orthogonal hodoscope system, as defined, produce data that is subject to statistical-correlation analysis for any of several possible functional dependencies, including spatial, temporal, and energy relationships. If there are more than one pair of said-one-or-more-collimated-radiation-detectors, such correlations can be computed between each and every detector as long as the data is collected in time-stamped or time-connected intervals that are amenable to cross-correlation and auto-correlation analysis.

In at least one preferred embodiment the "source" is a neutron source arriving along a z axis, which means there is a vertical as well as horizontal flux profile. The "target" region is the region common to the intersection of detection zones for the two orthogonal hodoscope collimated detectors. The radiation stimulated by an external neutron source (of unspecified energy) will consist of scattered and thermalized neutrons, thermal and high-energy capture gamma rays, inelastic gamma rays, and possibly fission gamma rays (which are in time coincidence as well as delayed coincidence) and fission neutrons (in time coincidence as well as delayed coincidence).

For most active-source HOC applications, we are probably dealing with penetrating 14-Mev neutrons from the (D,T) accelerator. We might have just one pair of HOC gamma detectors with an active neutron-generating source that produces gamma rays mostly in the target zone. Although orthogonal orientation is preferred, the detectors need not be perpendicular (e.g., at right angles), but could be at some other mutually exclusive angles so that their fields of view overlap only with exclusivity as represented schematically but not exactly. The detection energies E on which we want to concentrate would be chosen from those that are associated with prominent reactions for substances of interest (e.g., explosives, drugs, fissile materials, other contraband). Particular attention would be given to the elements N, H, C, and O. So, our initiating source term S is the active radiation source impinging on correlated zone of interest, while the foreground and background are composed of either similar or dissimilar radiative events that are not associated with the source/target zone. For the purposes of these computer-calculated simulations, we would need to estimate specific interactions (and rates) in each zone as a result of the external neutron source effects.

Hodoscope collimation is one controlling factor to reduce background. Another background controlling factor would have to come from the HOC approach in order to improve the signal/background ratio so that it is sufficient for specific substance detection and identification. Presumably we can include the direct uncorrelated source effect on the detector from within the consolidated background terms, but it really amounts to a third "background" effect, which might have to be taken into consideration separately. It might be possible to fold it into the "foreground" and "background" although it is a factor that is directly proportional to the source term, as will be the most if not essentially all of the foreground and background in this application too.

For this situation with an active source that induces background outside the correlation overlap zone, foreground and background need to be modeled such that they too are accordingly proportional to the strength of the external source. Using a term proportional to the external source and the target of interest that is itself independent of the source, the effect is manifested in accordance with its material properties that are chemical and density related within the target. The internal properties of the target are of interest because those properties, in aggregate, help characterize substances of interest. For example, the target energy might represent a definitive inelastic neutron scattering gamma ray from nitrogen at a defining energy, such as at 5.11 MeV, or a prompt capture gamma at 10.8 MeV.

Other energy bands of interest for the target energy might be set for prominent H, O, and C peaks. Although background from structural materials, would usually be present, such background as that from steel can be separated by energy windows at 7.6 and 9.3 MeV from iron. In some cases, these correlations will lag if they are the result of radiative activation. The originating source term will probably include radiation from the active neutron source which impinges directly on each respective detector by penetration or scattering that is entirely independent of the target.

Let us suppose we are detecting gamma rays directly correlated to neutrons from the neutron source S, which might also inject some gamma rays into the target region. So in this case source energy represents what is a gamma background effect that depends on the intensity of the neutron source. Also each detector might have some inherent "noise" that is unrelated to the target zone, but occurs without any source or target. Some of it would be electronic noise and some cosmic-ray or other radiation background that is uncorrelated with the source or target.

For validation purposes, it really doesn't matter whether the radiation source in a target zone is internally or externally induced, that is, whether it is a "passive" or "active" source. What matters is that the target zone radiates with its own characteristic (integrated over the zone) intensity. So one doesn't really need to compute how much radiation is needed to be generated in the target zone, as long as integration takes place over the non-uniform distributions emanating from each zone (e.g., foreground, background, and target [e.g., passive source]).

Efficient Statistics

A very logical question—that goes to the question of obviousness—arises when it is necessary to justify the correlation approach used in this patent. Why should the basic HOC arrangement of equipment, its operation, data recording, and data analysis be preferred over the traditional arrangements of a pair of independent detectors that are positioned orthogonally? The answer is partly a matter of more efficient statistics, which also differentiates this method from traditional methods. The necessity for more efficient statistics is based on existence of experimental situations whereby the signal from background is greater, or much greater, than the signal from the target.

The present invention, by means of its HOC equipment arrangement explicitly allows data to be accumulated in such a manner as to have considerably improved statistics compared to the traditional means of independent detectors separately collecting sequential data that can be averaged by taking the sum of all data over all count intervals and dividing by the total counting time.

This fundamental arrangement makes enables the use of established algorithms which advise that accumulating data in the form of the sum of products, differences, and ratios is a much more "efficient" statistical method of data treatment than using products, differences, and ratios of their sums. In the HOC method, each of these parameters and associated statistics can be separately computed for each $i^{th}$ interval, whereas in the traditional method of two independent detectors, only the computed sums integrated over all time intervals are available for analysis of their relationship to the source term. The HOC method also can and does of course compute sums over all time intervals in order to use those data values retroactively for determining variances as needed in orthogonal-correlation analysis.

The method of least squares is a standard and statistically efficient approach to the approximate solution of over-determined algebraic relationships, i.e., sets of equations in which there are more equations than unknowns. This situation applies here in making use of the two measured and four parametric relationships of the orthogonal-correlation method.

In mathematics, the idea of least-squares can be applied to approximating a given function by a weighted sum of other functions. The best approximation can be defined as that which minimizes the difference between the original function and the approximation. For the least-squares approach, the quality of the approximation is measured in terms of the squared differences of values and its average. Balance and symmetry are ways of insuring that the hodoscope correlation method will be orthogonal. Such orthogonal effects are independently estimable. When the data-collection design is orthogonal, there is less interference form possible masking or interference from other variables when assessing the importance of one particular variable, or of possible interactions among variables. Thus, in essence, the HOC for active sources method is distinguished from traditional methods by its defining properties of (1) hodoscope hardware collimation, (2) positional orthogonality, and (3) data-processing capability for—and employment of—the correlation analysis for every data-collection interval in the entire data stream.

Reaction Rates in HOC Scattering

If the total path length of all the neutrons in a cubic centimeter in a second is known, (neutron flux ($\phi$)), and if the probability of having an interaction per centimeter path length is also known (macroscopic cross section ($\Sigma$)), multiply them together to get the number of interactions taking place in that cubic centimeter in one second. This value is known as the reaction rate and is denoted by the symbol R. The reaction rate can be calculated by the equation shown below.

$$R = \phi \Sigma$$

where:
R=reaction rate (reactions/sec)
$\phi$=neutron flux (neutrons/cm-sec)
$\Sigma$=macroscopic cross section (cm)
Substituting the fact that $\Sigma = N\sigma$ into Equation (2-6) yields the equation below.

$$R = \phi N \sigma,$$

where
$\sigma$=microscopic cross section (cm)
N=atom density (atoms/cm)

Atom Density

One important property of a material is the atom density. The atom density is the number of atoms of a given type per unit volume of the material. To calculate the atom density of a substance, in atoms/cm$^3$:

$\rho$=density (g/cm$^3$)
N=Avogadro's number (6.022×10$^{23}$ atoms/mole)
M=gram atomic weight Example: A block of aluminum has a density of 2.699 g/cm$^3$. If the gram atomic weight of aluminum is 26.9815 g, the atom density of aluminum is $$N=\rho N_a/M=2.699\ (6.022\times10^{23})/26.9815=6.024\times10^{22}\ \text{atoms/cm}^3$$

Mean Free Path

If a neutron has a certain probability of undergoing a particular interaction in one centimeter of travel, then the inverse of this value describes how far the neutron will travel (in the average case) before undergoing an interaction. This average distance traveled by a neutron before interaction is known as the mean free path for that interaction and is represented by the symbol $\lambda$. The relationship between the mean free path and the macroscopic cross section is shown below:

$$\lambda=1/\Sigma.$$

Targets of Interest

Targets of interest or concern for HOC detection fall primarily in a number of general categories, depending on the intended area of application (e.g., national security, homeland security, medicine, military, research, dangerous substances, drugs, etc.). The category term itself is a rather coy effort to generalize without being judgmental. In the military field, materials of interest fall largely into four operational categories: de-mining, explosives detection, special nuclear materials, and chemical warfare agents. Civilian contraband, in general, includes drugs and other banned substances, including duty-payable items being smuggled. For aviation and other security purposes, explosives and concentrated chemicals are substances of particular interest. Firearms and other weapons also fall into a broad category of interest in Homeland Security. The external configuration of substance carriers might consist of postal parcels, luggage, cargo containers, trucks, and rail cars.

Neutron-based inspection techniques, the elemental densities of hydrogen, chlorine, and nitrogen can be measured thermal-neutron capture. Chlorine is the basis for the detection of hydrochlorinated cocaine and heroin. Nitrogen detection underlies detection of nitrogen-rich explosives. More specific detection of these forms of contraband is achieved by measuring their elemental constituents, namely oxygen, carbon, nitrogen, chlorine and hydrogen. The first four elements are detected by the characteristic gamma rays emitted when fast neutrons are inelastically scattered by the nuclei of the elements. Indeed, oxygen can only be detected by this process, while carbon is detected more efficiently by the same process. Nitrogen and chlorine can also be detected through the fast neutron inelastic scattering process, but with lower energy characteristic gamma rays. Fissionable materials are detected, obviously, by the products of the fission process. The elemental densities in minerals is determined mainly by the characteristic gamma rays emitted following the radiative capture of thermal neutrons.

More specifically, explosives are identified on the basis of high elemental density for O, N, but low C and H. Four defining and usable inelastic-scattering gamma-emitting nuclear reactions are 6.13 MeV for O; 10.8, 5.11, 2.31, and 1.64 for N; and 4.43 for C. Low-energy capture gammas of interest would be from N and H (at 2.22 MeV). Drugs such as cocaine and heroin have relatively high C, H, low O, and medium-low Cl, which has several strong lines. Cement and sand, which often constitute background, have thermal-neutron captures in Ca and Si. Nuclear materials, besides producing fission and capture reactions, have a high atomic density.

With the HOC technique, thermal-neutron capture and other types of reactions that are delayed with respect to the initiating event (such as radiative activation) can be detected and analyzed because a continuous stream of data is recorded in the binary intervals. The data can be analyzed for delayed correlations that correspond to radiative activation because it is all recorded in the case of pulsed radiation sources.

When pulsed-neutron radiation is available as a source, the pulse-time event can be recorded in a separate time bin that is synchronously recorded in parallel with the correlation data from the detectors. Thus, with no additional field equipment outlay, all three forms of reactions—thermal capture, activation, and inelastic scattering—are recorded and can be analyzed, depending on the requirements of the measurement. A similar situation applies to the APSTNG source method of neutron-emission marker by associated alpha-particle detection. The data stream can be analyzed according to prompt and delayed radiation correlated with the neutron initiation.

The analysis of delayed-correlation events provides an important additional means of ensuring the most efficient means of detecting all substances of interest. Modern computer data storage and algorithm calculations enable the contemporaneous on-site treatment of large data bases. In other words, instantaneous and delayed correlations with one or more detection channels can be analyzed with and without using the initialization trigger timing of neutron pulsing.

The extent to which the HOC configuration and analysis can be augmented by the initiated-pulse time depends on the field situation, which depends in part on the required rate of initiating pulses. Neutron issuance rates (from radioactive or accelerator sources) could be in the range of $10^3$ to $10^9$ per second, which would affect required timing and data storage requirements. Conversely, some useful activation events would not be consummated before delays in the millisecond to second time span. Inasmuch as binned data can be deliberately aggregated for optimal analysis, this should not be a problem because of large data-storage (and analysis) capacity now available.

Real-time detection of explosives is a major challenge in military de-mining. Detection of nitrogen-enriched chemical compositions is a major example of what would be required of an active-source HOC system. For simplicity, we note that N/H ratios for explosives are typically ~9; so simultaneous detection of N and H would be significant. Typical weight percent portions of N would be 20%-30% and for H would be ~2-4%. Explosives usually have an even larger weight fraction of O, but not many innocuous materials would have N/H or N/C ratios as large as do explosives.

Thus, as a surrogate for proof-of-principle, detection of N is sufficient. The 5.11 MeV inelastic gamma is a good indicator of N while the 2.33 MeV capture gamma from H. Notably, C has a prominent inelastic gamma at 4.43 MeV, and O at 6.13 MeV. The inelastic-scattering cross-section for 14 MeV neutrons is about 0.4 b (See Table: Nitrogen Cross Sections).

Hardware

For generalized concepts for alternative orientations of source and detectors for various conceivable accessible geometries, the basic equipment involved consists of (1) a source of radiation, usually neutron-induced gamma rays, (2) at least a pair of collimated detectors of the induced radiation, arranged orthogonally in such a matter as permitted by the circumstances to minimize conflicting background effects, and (3) an electronic processing system for the collected data, arranged in such a manner as to continuously measure, record, and evaluate correlation effects between the detectors. In addition, decision-making software might also be included so as to carry out pre-determined actions resulting from the data collected.

Applications

National security applications involve, for the most part, detection of weapons that are detonated with the aid of conventional explosives, including—but not limited to—improvised explosive devices (IEDs), landmines, chemical weapons, and nuclear explosives. One application of particular interest to military forces is an improvised explosives device (IED and landmine) detector, such as applications to unexploded-ordnance or improvised-explosive detection in national-security applications. Multiple source-detector combinations can be mounted laterally to broaden the sweep. Whether the system can be reduced in size for open-field use by non-mobilized personnel would depend on field-test results. In addition to the conventional-explosive content, distinct signatures of chemical weapons can be detected by virtue of their unique combination of certain elements, such a Cl, S, and P.

In order to carry out checked-luggage inspection for banned substances, the apparatus could be located within internal checked-luggage-transport facilities. Any or all of the HOC concepts could be applied to luggage inspection in homeland-security applications. The unique signature of nuclear weapons, and fissionable materials of any type, is the creation of fission events as a result of neutron interrogation. The HOC method is particularly sensitive to small quantities of fissile or fertile materials, even if shielded. This specific concept for applies to nuclear-materials detection inspection in national-security and homeland-security applications. Homeland security has a broad range of interest in banned substances, including explosives, chemicals, nuclear materials, drugs, and other contraband. All such substances are subject to distinct detection and identification by the HOC method.

In those situations which involve high radiation levels for medical diagnostic or therapeutic purposes, more efficient and/or definitive means of detecting the radiation or specifying its location in a body reduces the dose that must be ingested, injected, or otherwise applied to human beings and animals. The HOC methods lends itself to reducing necessary exposures for both passive (internal) and active (external) radiation sources needed to obtain the same medical benefits as stronger sources that depend on present-day technology for detection and localization in a body.

Requirements for Electronics and Software

Based on receiving a pre-amplified linear signal from a detection device, such as a sodium-iodide crystal mounted on photomultiplier tube, computer-controlled equipment would be used to process and collect data in uniform count intervals, recording designated multiplicity of pulse amplitudes depending on the application.

While the data is being recorded, the digital-data processing software would be analyzing correlations on a continuous basis, providing readouts that are manually or automatically interpreted and acted upon, according the established respective protocols. No especially complex or extraordinary equipment is needed for processing HOC data. In general, preset algorithms will be invoked to distribute warnings, alerts, or information to equipment operators, system managers, or responsible officials. For fielded equipment, many of these functions will be consolidated in order to minimize operator decision-making, and the potential for erroneous interpretation.

Technology for Applying Scattered Radiation Sources

Embodiments described in this section relate to all types of scattered radiation sources, whether radioactive or by accelerator production, although it does not preclude that the substance of interest might itself have inherent radiation that is constructively helpful or that is an unavoidable source of radiation background in this application.

Underlying these embodiments, as well as the referenced specific prior art, is the aforesaid hodoscope-diagnostic technology which optimizes the detection of selected types and origins of nuclear radiation. In general, as compared to most other radiation-detection technology, hodoscope radiation-detection systems are designed in a modular manner so as to offer specificity, durability, and reliability in designated functions. Operated either in single or multiple modules, with designed ability to be calibrated and to change its field of view, hodoscope detectors have a proven high degree of utility in a variety of unique applications. Various types, intensities, and durations of radiation can be accommodated by design. For the purposes of these related patents, this feature specifically includes pre-selected sensitivities to neutrons of specific energy ranges and to gamma rays of various energy levels. In addition, functional neutron/gamma diagnostic hodoscopes have accumulated decades of relevant experience operating at nuclear reactors.

Based on the established foundation and applicability of hodoscope technical and operational experience in nuclear reactors, the present invention has been proven to operate immediately external to or within severe and complex radiation environments. Not only has a substantial experimental base been established, but detailed determinative and stochastic computations have been performed for applications extended to new environments and geometries.

Many radiation-detection technologies utilize scattered radiation, that is, radiation that is incident upon but deflected from an object. Such radiation-detection technologies differ fundamentally from radiation-detection technologies that utilize passive or active radiation sources. Passive sources spontaneously emit detectable radiation, and active sources emit detectable radiation when stimulated by external means.

Ionizing and Non-Ionizing Radiation

Radiation is a physical process in which energetic particles or waves travel through a vacuum or through matter. Energetic types of radiation are differentiated by the way in which they interact with normal chemical matter: whether they ionize or do not ionizing the material with which they interact. This patent chooses not to differentiate between ionizing radiation (e.g., neutrons, gamma rays, electrons, or x-rays) or non-ionizing radiation (e.g., radio waves, heat, or visible light), inasmuch as all such forms might benefit from this patent application.

As explained generally in the Background section of this application, specific particles or waves that are the subject of this patent radiate (i.e., travel outward in all directions) from a source of emission, usually following an inverse-square law of radiated power with regard to distance from the source. Radiation with sufficiently high energy can ionize atoms, which often leads to one of several means for practical detection of such radiation. Typically, photons and particles with energies above about a 10-electron volt (eV) threshold are ionizing forms of radiation. Alpha particles, beta particles, cosmic rays, gamma rays, and x-ray radiation all carry energy high enough above the threshold to ionize atoms. In addition, neutron radiation can also be ionizing in effect, since the result of neutron interactions in matter is inevitably more energetic than this threshold. Ionizing radiation comes from radioactive materials, x-ray tubes, particle accelerators, and is present in the environment on Earth and from cosmic-radiation sources. Nuclear instruments such as Geiger counters are usually required to detect the presence of ionizing radiation. In some cases, it may lead to secondary emission of visible light upon interaction with matter, as in Cherenkov radiation and radioluminescence. The ability of an electromagnetic wave (of photons) to ionize an atom or molecule depends on its wavelength (or corresponding radiative frequency), which characterizes the energy of a photon of the radiation.

Light, or visible light, consists of a very narrow range of electromagnetic radiation at a wavelength visible to the human eye (about 400-700 nm), or up to 380-750 nm. More broadly, physicists refer to light as electromagnetic radiation of all wavelengths, whether visible or not. Visible and other wavelengths of light, such as infrared, are subject to detection by suitable devices. Alpha particles are helium-4 nuclei that interact with matter with a high degree of ionization, such that its range of penetration in matter is quite short. Beta-minus ($\beta-$) radiation consists of an energetic electron. Beta radiation from radioactive decay can be stopped with a few centimeters of plastic or a few millimeters of metal. Beta radiation from linac accelerators is far more energetic and penetrating than natural beta radiation. Beta-plus ($\beta+$) radiation is the emission of positrons, which are antimatter electrons. When a positron slows down to speeds similar to those of electrons in the material, the positron will annihilate an electron, releasing two gamma photons in the process. Those two gamma photons will be traveling in (approximately) opposite directions. Neutrons are often categorized according to their speed. Neutron radiation consists of free neutrons, which might be emitted during either spontaneous or induced nuclear fission, nuclear fusion processes, or from other nuclear reactions.

Neutrons can make other objects, or material, radioactive. This process, called neutron activation, is the primary method used to produce radioactive sources for use in medical, academic, and industrial applications. Even comparatively low speed thermal neutrons, which do not carry enough kinetic energy individually to be ionizing, will cause neutron activation.

Both slow and fast neutrons react with the atomic nuclei of many elements upon collision with those nuclei, often creating unstable isotopes and therefore inducing radioactivity in a previously non-radioactive material. This is called neutron activation. High-energy neutrons have the ability to directly ionize atoms. High-energy neutrons are very penetrating and can travel great distances in air (hundreds or even thousands of meters) and moderate distances (several meters) in common solids. They typically require hydrogen-rich shielding materials, such as concrete or water, to block them within distances of less than a meter. Neutron scattering for 1 MeV incident neutrons is generally two orders-of-magnitude greater than neutron absorption for most elements. However, the angle of deflection of the neutron is smaller as the mass of the target nucleus becomes larger. Neutrons with energy of 1 MeV have a scattering mean-free-path ($1/\Sigma_s$) of about 1.9 cm in the oxide of uranium. It implies, for example, that a 1-MeV neutron will have a high initial reaction rate in uranium oxide, but that rate will be subsequently and rapidly altered because the neutron energy will decrease in each collision and the cross-section will also be changing as the neutron energy decreases.

Some neutron scattering will result in energy lost through inelastic scattering, which will create a gamma-ray at the point of interaction. Neutron absorption (usually at lower energies), in contrast to neutron scattering, could result in any one of several processes in which various other forms of detectable radiation are emitted. For the purposes of the present patent application, it is important to note that the predominant interaction of 1-MeV incident neutrons with materials of various densities is outscattering from the target zone, although the angle of outscattering for high-density materials is small compared to the angle of outscattering for water. In general, neutrons of energies greater than 1 keV (or thereabouts) incident on a target will undergo scattering reactions (with the exception of certain resonant reactions) in preference to any kind of absorption reaction. This phenomenon preferentially favors the HOC method for radiation-scattering detection.

X-rays are electromagnetic waves with a wavelength smaller than about 10 nanometers. A smaller wavelength corresponds to a higher energy. A "packet" of electromagnetic waves is called a photon. When an x-ray photon collides with an atom, the atom may absorb the energy of the photon and boost an electron to a higher orbital level or if the photon is very energetic, it may knock an electron from the atom altogether, causing the atom to ionize. Generally, a larger atom is more likely to absorb an x-ray photon, since larger atoms have greater energy differences between orbital electrons. Soft tissue in the human body is composed of smaller atoms than the calcium atoms that make up bone, hence there is a contrast in the absorption of x-rays. X-ray machines are specifically designed to take advantage of the absorption difference between bone and soft tissue, allowing physicians to examine structure in the human body.

Radiation and radioactive substances of many types are frequently used for medical diagnosis, treatment, and research. For example, x-rays pass through muscles and other soft tissue but are stopped by dense materials. This property of x-rays enables medical practitioners to identify broken bones and to locate cancers that might be growing in the body. Doctors also find certain diseases by injecting a radioactive substance and monitoring the radiation given off as the substance moves through the body. Radiation used for cancer treatment is called ionizing because it forms ions in the cells of the tissues it passes through as it dislodges electrons from atoms. This ionization process is deliberately used to kill cells or change genes so the cells cannot grow. Most other common forms of radiation found in the environment such as radio waves, microwaves, and light waves don't have as much energy and are not able to ionize cells.

In general, neutron scattering cross-sections tend to be large both for water on one extreme, moderate for medium elements, and become gradually larger for heavy metals.

However, x-ray (and gamma-ray) scattering cross-sections are small for water and increase substantially as the target density increases.

Gamma (γ) radiation consists of photons with a frequency nominally greater than 1019 Hz. Gamma radiation is composed of photons, which have neither mass nor electric charge. Gamma radiation penetrates much further through matter than either alpha or beta radiation, which have an electric charge and mass, and thus are far more likely to quickly interact with other atoms in their path.

Gamma rays, which are highly energetic photons, penetrate substances deeply and are difficult to stop. They can be absorbed by a sufficiently thick layer of material, where stopping power of the material per given area depends mostly (but not entirely) on its total mass, whether the material is of high or low density. However, as is the case with x-rays, materials with high atomic number such as lead or depleted uranium add a modest (typically 20% to 30%) amount of stopping power over an equal mass of less-dense and lower atomic weight materials (such as water or concrete). This proportional effect can be useful in selectively detecting materials of high density.

The so-called Compton effect is the predominant interaction mechanism for gamma-ray energies that are typical of radioisotope sources, while pair-production would be the dominant effect for accelerator-produced high-energy gamma sources (above several MeV). At high values of incident gamma-ray energy there is a strong forward-scattering tendency, which increases monotonically with increased atomic number.

Spontaneous Radiation Sources

Radiation might derive either from spontaneous natural origin or from some source artificially assembled, manufactured, or created. If from natural inception, it is usually diffuse in spatial extent, emanating from soil, nearby objects, or through the atmosphere from outer space. A spontaneous radiation source is one that exudes radiation without external stimulation, although that emission might be stimulated by conversion of one form of spontaneous radiation to another, as in neutron sources caused by alpha radiation impinging directly on the element beryllium.

Another commonly used source of spontaneous radiation is produced by the decay of the transuranium element Cf-252. A natural spontaneous radiation source could be assembled on a simple metal foil or other medium so as to be concentrated at a single point—considered to be a point source—or it could be dispersed in a larger volume—considered a distributed source—or derived from a beam of radiation, typically from an accelerator. Spontaneous radiation sources could consist of a single form of radiation of a single energy, considered monoenergetic, or consist of a mixture of radiation with one or more emission energies.

Artificially created radiation is produced typically in devices that accelerate electrons or protons so as to create nuclear reactions of the type that result in the contrived emission of neutrons and/or gamma rays. These accelerator-created radiation sources are, for the most part, focused at a target point or directed in a beam: some might be emitted isotropically, and some might be emitted in a forward-based direction along the path of acceleration. The primary objective with artificially created radiation is to irradiate a target in its FoV.

Radiation Background

Radiation "background" consists of any external effect that is not associated with, but competes with identification and quantification of the intended radiation "source." Generally background is present as an external, unwanted form of radiative emanation that competes with the deliberate and specific detection of a source.

In various contexts, radiation background may simply be any extraneous radiation that is pervasive and detectable, whether ionizing or not. A particular example of this is the cosmic microwave radiation background, a nearly uniform glow that fills the sky in the microwave part of the electromagnetic spectrum. Light and other radiation from discrete stars, galaxies and other objects of interest in radioastronomy stand out prominently against this form of generalized radiation background.

Some radiation that is considered background might, in fact, be directly related to the designated source of interest, but that form of background radiation might arrive at the detector by undesired means or direction. Collimation is the primary technical method by which incoming radiation is limited or confined to the designated source and to minimize radiation background; collimation is a feature fundamental to the HOC method.

In a laboratory or experimental environment, background radiation refers to any competing sources that affect an instrument measurement when a radiation source sample is absent. This pervasive radiation background rate is ordinarily subtracted from the sample measurement; however, such radiation background must be determined by multiple measurements, usually before and after sample measurement, provided the source and background are sufficiently stable and mensurable.

The process of subtracting radiation background based on one or more separate disparate measurements will affect the statistical quality assignable to the source radiation intensity, as parameterized above. This effect on statistical confidence is often a major limitation in attempting to determine the strength of the source based on the process of making measurements of total intensity separate from radiation background. While radiation background measurements can be attempted when the source is not present, it is often not feasible in actual circumstances in the field.

The ubiquitous ionizing radiation to which the general human population is exposed, including natural and artificial sources, is one form of background. (Both natural and artificial background radiation vary by location.) However, specific instantaneous background radiation at a given location (or altitude) is unavoidably associated with uncontrollable circumstances that often affects the statistical quality of a measurement made for a given radiation source.

For the purposes of this invention, scattered radiation consists of all effects that result from the dispersion or spreading out of radiation as a result of radiation-source interaction with any material medium in its path (including air). Radiation of all forms and energies are subject to sometimes-unavoidable scattering processes. Radiation deflection might involve back scattering, out scattering, or forward scattering at any angle with respect to the incident direction of the source radiation. Most scattering processes result in energy being lost by the incident radiation when it suffers any kind of interaction.

Scanning Cargo for Clandestine Objects and Materials

Considered a significant and ongoing technical problem in national and international security is the possibility that trans-shipped cargo containers conceal dangerous or clandestine items. In order to detect such contraband, many technical methods can be and are applied: Some of the most non-invasive means reduced to practice use external radiation sources to interrogate (or to "scan") contents without requiring that the cargo container be opened for inspection.

Cargo is shipped by a variety of transport: waterborne ships, highway trucks, rail trains, aircraft, and other conveyance. Cargo is often crated into containers that are often officially and functionally sealed and logistically controlled by appropriate shippers, authorities, and manifest documentation.

Publically shipped cargo has sometimes been used to transport clandestine materials—including illicit drugs, explosives, money, chemicals, heritage items, as well as other banned substances and equipment. Transport of illegal cargo across national or state boundaries has been a particular focus of law-enforcement and customs authorities, especially because of post-9/11 threat perceptions.

A variety of means—aside from intrusive ad-hoc physical inspection by human beings—have been used to detect banned materials. The technical means of inspection are needed because of a huge quantity of cargo crosses state and national boundaries. Some of the most effective technical means of inspection involve the use of external radiation sources that are capable of penetrating through and identifying hidden banned substances.

A variety of inspection applications of penetrating radiation have been employed. For cargo, cargo containers, and cargo vehicles, often used have been radioactive gamma-ray sources, such as Co-60 or Cs-137. Such radiation sources are relatively easy to utilize in technical-inspection practice, but they have fundamental limitations when applied, for example, to large containers filled with dense objects.

Linear accelerators (LINACs) can also be used to produce gamma rays that scan larger cargo items. X-ray radiography using LINACs is similar to gamma-ray radiography, but instead of employing a radioactive source, it utilizes a high-energy bremsstrahlung spectrum with energy in the 5-10 MeV range created by a linear accelerator. Such high-energy x-ray systems can penetrate up to 30-40 cm of steel: High-energy x-rays are usually more suitable than radioactive gamma-ray systems for the detection of bulk special high-density nuclear materials.

Some cargo-scanning concepts combine fast-neutron and x-ray/gamma radiography. Multiple-radiation scans can be processed to produce high-resolution radiographic images that sense and depict areal density and material composition. Determination of such properties increases the likelihood that clandestine materials will be detected; if not, the risk of detection acts as a deterrent. However, one problem is that the range of clandestine materials is too extensive for a "one-size-fits-all" detection and identification strategy.

Moreover, radiation scanning of large cargo is usually limited to interrogation of certain technically detectable parameters of an object, such as materials density, rather than chemical composition of the object (which might be more definitive).

Another constraint, especially for application in cargo inspection, is the intensity and amount of radiation that can be applied in the vicinity of personnel, such as drivers, operators, inspectors, bystanders, and stowaways.

Intermodal cargo containers are typically 2.5 meters in height and width, 6 or 12 meters in length, and carry up to 27 metric tons of freight. Thus, the task of finding a small amount (less than 1 kilogram) of hidden fissile material within intermodal cargo containers is technically and procedurally difficult.

It is the intent of this HOC "scattering" patent to minimize some of these contraband-inspection difficulties, causing such inspections to be more fruitful and definitive, while requiring less time and requiring less extraneous radiation.

Concurrent Radiation Detection

An essential aspect of this HOC "Scattering" patent for detection of radiation scattering is the inclusion of means to concurrently record data collected for different variants and features of radiation incident on the HOC detectors. Examples of concurrent-detection data requirements are (1) having in place the means for recording data from both neutron and gamma detectors simultaneously and (2) recording such data in separate data-recording channels. Another example of concurrent detection, is the sorting of simultaneously recorded data for any given detector into separate corresponding energy bins, such that cross-correlations can be mathematically analyzed for one or more different recorded energy combinations, as well as between one or more types of radiation detected.

A more specific example would be a pair of neutron and gamma detectors assembled in tandem for each HOC detector, wherein the quantity and range of data available will consist of pulse-height spectra for each neutron detector and each gamma-ray detector, such data simultaneously and electronically registered for each time interval being recorded.

A similar, but less comprehensive physical layout and data recording arrangement was enabled for the TREAT hodoscope, as detailed in applicant's expired 1978 patent "High-Resolution Radiography by Means of a Hodoscope," in which neutron detectors preceded gamma detectors in chosen collimated hodoscope channels. While data was collected during simultaneous intervals from all detectors in application of that aforesaid expired patent, no positionally orthogonal relationship existed between detectors (partly because of physical-access limitations), and no subsequent correlation data analysis was carried out for the collected data (although data was recorded for simultaneous intervals), and no phenomenological comparison was made between recorded neutron and gamma data (lacking a specific requirement). In practice, data collected from neutron channels was simply intercompared after each experiment with data from like adjacent neutron channels, and data collected from gamma channels was intercompared with data from like adjacent gamma channels. Concurrent radiation detection in the forms described is, however, an essential embodiment of this present invention for scattered-source HOC function.

Prior existing technical means for detecting scattered radiation has often been the same as or similar to that used for detecting unscattered radiation. Radiation-detection technology usually ignores or makes use of the fact that scattered radiation loses some energy and suffers some changes its direction, whereas unscattered radiation (or that radiation which undergoes very slight change in direction upon being scattered) is transmitted and/or detected. This difference in transmittance is normally a feature observed and utilized in traditional radiation-transmission measurements.

Transmission radiography generally depends on significant variations in object density compared to adjacent materials—thus on total mass or density of the object under inspection and thus on the degree of attenuation or outscattering of the transmitted radiation beam.

Embodiments described in this section apply specifically to scattered radiation for which the type of radiation that is available after scatter is the same type as that which existed before the scattering event. In general, this scattered radiation would consist of the same incoming radiation form, but scattered in a direction different from the incoming beam, and probably losing energy in the one or more scattering processes that take place. Nothing precludes the occurrence of multiple-scattering events, nor is there any requirement that multiple-scattered radiation propagate in its original form.

Ordinarily, x-ray images are reconstructed from the relative intensity of transmitted radiation. For example, soft tissue compared to bony tissue in a biological object would result in more x-ray transmission—and, thus, detected x-rays. The result of this phenomenon is a contrast-enhanced image of x-ray transmission, scattering, and absorption.

X-rays incident on a target might be transmitted, absorbed, or scattered out of the incoming x-ray beam. Those x-rays that are transmitted, when compared to those that are incident, provide a contrast-defined image when absorbed in a recording medium, such as photographic film or an array of solid-state x-ray detectors. Consider, for example, a collimated beam of x-rays directed at a specific artificial target, as in X-rays scattered out of the incident beam would be deliberately subject to detection by the HOC system, and thus would provide additional information associated with whatever target zone is common to the FoV of the HOC detectors. If that common FoV has unique density-variation characteristics, the HOC method covariance analysis will thus provide an indication of target-material density; however, it will not by itself provide an indication that is linearly proportional to target density.

Usually, incorporation of the HOC method in the measurement process for traditional medical and dental applications of x-rays would not expected produce substantial added information. However, the outcome of the HOC method might be more positive for high-energy gamma-ray and/or neutron transmission and scattering because so few gamma rays and fast neutrons might be absorbed compared to the number that are scattered. The typical gamma-ray scattering cross-section $\sigma_s$ is large compared to its corresponding absorption cross section. Moreover, the cross-section dependence on target density might be such that transmission is less of a meaningful indicator than scattering, for example in the detection of high-density materials such as uranium.

A similar observation might be made of fast-neutron scattering from a target, wherein the elastic scattering cross-section is often much larger than the combined neutron inelastic and absorption cross-sections. When interrogating an object using fast neutrons, many neutrons do not become of value to the inspection object-differentiation process if the detection requirement is limited to neutron transmission, capture, or inelastic scattering.

Unique features of embodiments described in this section include: (1) detection hardware in this invention that combines well-defined prior-art hodoscope collimation and detection techniques for scatter radiation, coupled with a radiation source, and (2) data processing hardware and software in this invention that makes use of classic data-correlation techniques. When the specified target of interest is irradiated by highly-penetrating radiation, usually neutrons or gamma-rays (not necessarily pulsed), the incident radiation is unavoidably scattered by the target and its immediate environment. The approach of this invention complements and supplements the "active" and "passive" modes of substance identification for which separate provisional patents had been previously filed. This method can make use of, or be used in connection with or simultaneously with, essentially all forms of induced, transmitted, or scattered penetrating radiation (not only fast neutrons as an interrogation source, but also lower-energy neutrons, as well as high-energy x-rays, gamma rays, ultrasonic pulses, radar reflections, and other means of probing that might provide specific correlated identifying characteristics from the target zone).

Typically, in implementation of this HOC invention, a pair of gamma and/or neutron detectors is arranged externally and orthogonally on a plane that is itself orthogonal to the active source. The HOC for radiation scattering method of this patent enhances nuclear detection of heavy elements, such as uranium or lead, compared to lighter elements. Because of its enhanced efficiency, it is possible to use comparatively weak-intensity neutron or gamma radiation sources. This method would allow efficient determination of the relative densities elements by distinguishing scattering reactions that typify specific elements or components. The HOC method for radiation scattering of this patent includes appropriate data processing and mathematical algorithms aimed at improving both the sensitivity of the systems and their effectiveness in discriminating false positives and nuisance alarms. The implementation of the HOC for scattered radiation sources of these embodiments is based on a combination of theoretical and experimental results, as well as new analysis capabilities in the form of improved algorithms.

These methods can be applied to medical and other related fields of radiography where radiation sources are normally used. This method should reduce the radiation dose absorbed, and as well as incidental doses involved in handling radiation sources. Because dose localization can be improved, reduced doses could result from diagnostic testing, imaging, and treatment with medical radiation beams.

If the external radiation source is in the form of neutrons, some radiation from the external radiation source (of unspecified energy) will consist of scattered and thermalized neutrons, thermal and high-energy capture gamma rays, inelastic gamma rays, and possibly fission gamma rays (which are in time coincidence as well as delayed coincidence) and fission neutrons (in time coincidence as well as delayed coincidence). In addition, and of defining importance to this patent application, is that the neutrons introduced by the external neutron source will also be scattered by the various components within the target zone, as well as by its immediate surroundings.

If the external radiation source is in the form of x-rays or gamma-rays, some radiation from the external radiation source (of unspecified energy) will consist of scattered and collision-product x- or gamma-rays. In addition, and of defining importance to this patent application, is that the radiation introduced by the external radiation source will also be scattered by the various components within the target zone, as well as by its immediate surroundings. For most applications, we are probably dealing with "active" penetrating radiation generated by an nuclear accelerator, although "passive" radiation sources might be used as well in certain situations. Detector pairs might be for either or both of neutron and/or gamma rays, as appropriate.

If we just have one pair of HOC radiation detectors with an active radiation-generating source which produces radiation that is scattered within in the target-beam radiation cone, but especially in the overlapping zone, the following applies: Each radiation detector will be operated in a pulse- or current-collection mode, and energy spectra, if appropriate, will be stored by a pulse-height analyzer in energy bins. To be considered truly orthogonal, the detectors should be perpendicular (e.g., at right angles) to each other, but in practice their orientation could be at some other mutually exclusive angles such that their FoVs overlap only with the exclusivity as represented schematically but not exactly.

The radiation-detection energies on which these embodiments concentrate would be chosen from those that are associated with prominent reactions for substances of interest (e.g., radiation from high-density materials). Particular attention would be given to fissionable materials that might be enclosed in radiation-shielded surroundings; such materials have higher density than most other materials usually to be found in drums or cargo containers. Thus, in this typical or representative arrangement, our initiating source term is an active radiation source impinging on the central positionally-correlated zone of interest, while the intervening foreground and external radiation background cause either similar or dissimilar radiation scattering effects aside from that occurring in the source/target zone.

For the purposes of computerized numerical simulations, specific scattering interactions (and rates) would be estimated in each zone as a result of the external radiation source effects. From target and radiation background rates or ratios would be recorded counts derived from a single detector, with more definitive results expected from the orthogonal pair. Without collimation, each detector would receive a larger fraction of the radiation background. In addition, the source would directly affect the detectors and their shielding. While the originating source of radiation might eventually result in an energy-dependent flux through and around the target zone, the source energy term is included in the discrete energy intervals for which correlated data will be recorded.

Hodoscope collimation is one controlling factor to reduce detector radiation background. Another radiation background controlling factor would have to come from the correlation-analysis approach used to improve the signal/background ratio in order to obtain specific indication of an object that has a different interaction cross-section.

Presumably we can include the direct uncorrelated source effect on the detector within the consolidated radiation background terms, but it mathematically amounts to a third "background" effect, which might have to be taken into consideration separately. It might be possible to fold it into the "foreground" and "background" although it is a factor that is directly proportional to the source term, as will be most if not essentially all of the foreground and background in this application. For an application wherein an active source that induces radiation background outside the HOC overlap zone, foreground and background need to be modeled such that they too are accordingly proportional to the strength of the external source. As previously described in the Background section, a fundamental underlying concept has been the author's invention of the hodoscope, which has extensively proven itself to provide durable, reliable, and definitive means of detecting and imaging a radiation field in a complex environment that included stray radiation which constituted non-informative background. The hodoscope was able to function at a wide range of reactor-source power levels. The hodoscope system was designed in one of its embodiments so that it could operate as a stationary detection system while the reactor was at high or transient power levels, or immediately after shutdown. The hodoscope was also designed in another embodiment so as to be movable in order to scan the source of residual radiation at the center of the reactor long after the reactor had been shut down. The hodoscope invention relied on detection of either or both of neutrons or gamma rays of selected energies. However, the hodoscope as previously patented did not operate in an orthogonal mode, nor was its data analyze in the correlation mode.

Scattered Radiation

This HOC method for "scattered" sources is based on the continuous recording of collected data in equal time intervals for at least one pair of detectors that are chronologically synched. It is not necessary that the detector angles be perpendicular on any plane; they must, however, be able to collect data independently of each other that is recorded in identical time intervals, and all data in the identical intervals must be tagged and stored according to corresponding detector identification and time interval. The target of interest for this invention is the object subject to substance detection and/or identification. It usually is, but need not be, enclosed within a large container which is likely to be filled with an unknown surrounding material of unknown and possibly variable density. The external source of active stimulation, typically an artificial-radiation generator, is to be located close to the target container, but as far away as possible from the collimated detectors. The source must generate detectable reactions in the target. However, the external source might also cause radiation background events, some of which are necessarily included in the detector count during any interval. In fact, this invention is of most value compared to traditional methods when there is an unavoidably large proportion of radiation background compared to signal from the source.

The FoV of view of both HOC detectors should intersect within the container and be focused at a common nexus within the target container, usually an object of interest for substance identification. In addition, it is assumed that the all identical intervals for the collection of data are free of data deadtime and data overlap. However, it is possible to operate and use the HOC mode invention in an ionization-current mode as well as a pulse-amplitude mode. Current mode might be important if source and background signals might overwhelm the pulse-data processing equipment (as might be the case if the source or background are generated by pre-existing radiation background of the same type as, or sufficiently similar to, that which is sought to be detected from the source).

It is important to keep in mind that almost all of the applications for the HOC equipment and operation deal with situations for which detection, rather than quantification, is a necessary and sufficient primary goal. In other words, determining the presence of a substance is more important than determining how much of the substance is present. For example, determining that nuclear material is present in the target zone is usually far more important than determining how much is present. More quantitative detection can be obtained either by maneuvering the detectors in such a way as to obtain more data, or by using complementary or alternative means.

If the geometry of the substance in question is at issue, the HOC detectors could be mechanically scanned vertically and/or laterally to further define the region for which a positive correlation is obtained. Again, this is not a matter that requires statistically accurate determination, but it is a matter that benefits from adequate precision to determine the general shape of the object under inspection.

Scattered Source Estimates

In order to enable estimation of the intensity required for a scatter gamma source that impinges on an assumed target, some ad-hoc approximations are needed. For detection we could use a pair of large (2" or 4") NaI or BGO crystals. Two types of neutron sources would be useful to simulate: Cf-252 and 14 MeV(D,T). From an external $4\pi$-emitting source, induced gamma production in the target and its surroundings is likely to be some type of continuous distribution as a function of distance into the target, starting at the origin, peaking at some distance inside, and tailing off to a low value at the most distant point.

Overlapping Target Zone

If the object of inspection is larger than the FoV of the orthogonal detectors, we need to consider the correlation associated with portions of the target that are in the foreground and background zones of each detector. As far as the detectors are concerned, they are not correlated, but as far as the target is concerned, they are an extension of the target source term. Both neutron and gamma/x-ray sources need to be estimated. In order to evaluate comparative effectiveness and statistical confidence, it is necessary to evaluate the expected rates of useful nuclear reactions.

Neutron Reaction Rates

If the total path length of all the radiation in a cubic centimeter in a second is known, flux, and if the probability of having an interaction per centimeter path length is also known (macroscopic cross section), multiply them together to get the number of interactions taking place in that cubic centimeter in one second. This value is known as the reaction rate. The reaction rate can be calculated.

Mean Free Path for Neutrons

If a neutron has a certain probability of undergoing a particular interaction in one centimeter of travel, then the inverse of this value describes how far the neutron will travel (in the average case) before undergoing an interaction. This average distance traveled by a neutron before interaction is known as the mean free path for that interaction and is represented by the symbol $\lambda$. The relationship between the mean free path and the macroscopic cross section $\Sigma$ is shown below:

$$\lambda = 1/\Sigma$$

The main point to take from the table above is that transmission radiography that employs high-energy neutrons will have a difficult time distinguishing heavy metals from other substances in a container. However, neutron-scattering as proposed in this invention would have a better opportunity to gain a significant count rate. More promising for better detection of heavy metals would be gamma-transmission radiography. Targets of interest or concern fall primarily in a number of general categories, depending on the intended area of application (e.g., national security, homeland security, medicine, military, research, dangerous substances, drugs, etc.). These targets for scattering techniques are basically the same as for active techniques discussed above.

Sensitivity

Some parameters will be outlined that need to be taken into account in making sensitivity estimates for HOC gamma-ray scattering estimates will be provided. The actual physical situation will need to be taken into account for numerical estimates to be made.

Gamma-ray radiography systems capable of scanning trucks usually use cobalt-60 or caesium-137 as a radioactive source and a vertical tower of gamma detectors. In this invention, there would be two vertical towers to detect scattering from any type of radiation source, neutron and/or gamma.

The horizontal dimension of the image may be produced by moving either the truck, the scanning hardware, or a underlying platform. "Passive" radiation sources, such as cobalt-60 use gamma photons with a mean energy 1.25 MeV, which can penetrate up to 15-18 cm of steel. Such systems provide good quality transmission-attenuation contrast images which can be used for identifying cargo and comparing it with the manifest, in an attempt to detect anomalies. It can also identify high-density regions too thick to penetrate, which would be the most likely to hide nuclear threats.

The HOC detector vertical tower of this patent would not be in direct line of sight of the source, but would rely on scattered radiation, although it could be used as well for gamma-rays produced by neutron interactions in the target, as presented in the "Active" version 2013 Active HOC Provisional Patent Application. The primary difference between that patent application and the present application is that the latter relies primarily on neutron-produced induced radiation as the measured parameter, while this present application relies on scattered radiation as the measured parameter. In practice, similar HOC detection-array tower pairs could be implemented with a dual function of detecting both scattered and induced radiation. Of the interactions that can occur in any object are photoelectric absorption (mostly at low energies, Compton scattering (at intermediate energies), and pair production (at higher energies). The three interaction processes contribute to the total mass-attenuation coefficient. The relative importance of the three interactions depends on gamma-ray energy and the atomic number of the absorber.

All elements except hydrogen show a sharp rise at low energies, where photoelectric absorption is the dominant interaction. The energy-related position of the rise is very dependent on atomic number. Above the low-energy rise, the value of the mass-attenuation coefficient decreases gradually, indicating the region where Compton scattering becomes the dominant interaction. The mass attenuation coefficients for all elements with atomic number less than 25 (iron) are nearly identical in the energy range 200 to 2000 keV. The attenuation curves converge for all elements in the range 1 to 2 MeV. The shape of the mass attenuation curve of hydrogen shows that it interacts with gamma rays with energy greater than 10 keV almost exclusively by Compton scattering. Above 2 MeV, the pair-production interaction becomes important for high-Z elements and the mass attenuation coefficient begins to rise again. For the purposes of this patent, pair production can be considered a form of out-scattering whereupon the radiation initially incident on the target is converted to a form of radiation that is well-suited for detection by orthogonal radiation-scattering detectors. For gamma rays introduced with energies between 1 and 10 MeV, the mass-attenuation coefficient for low Z materials is roughly linear, whereas elements such as iron begin to have a constant coefficient, and heavy metals tend to have a larger and increasing coefficient with increasing gamma energy. Whereas the differentiation between the heavy elements and the medium elements is roughly similar around 2 MeV, it becomes more pronounced above 5 MeV. With the exception of total photoelectric absorption, which occurs primarily at low energies, most of the gamma interactions result in what amounts to effective outscattering of the incoming gamma beam.

Gamma-Ray Detection

The primary method advocated in this patent for determination of measurement objectives is the detection of radiation scattered from the incident beam. Thus, all gamma-ray incident-beam interaction processes that result in outscattering are significant for HOC detection in this invention; accordingly, it is useful to be aware of those processes which improve detection of gamma rays from scattered radiation, in contrast to radiation from the incoming beam which is transmitted or fully absorbed. Interactions that result in backscatter, which peaks at approximately 0.25 MeV, might be especially useful because its frequency of occurrence as an indicator of outscattering from the target. The energy-specific response density and linearity of the HOC gamma detector is fundamentally unimportant, although some degree of specificity might be achievable by recording and analyzing linear (or roughly linear) energy responses in separate concurrent data channels. The specific type of gamma-ray detector is relatively unimportant; more important are generalized properties of efficiency, cost, and reliability. Usually traditional sodium-iodide (NaI-Tl) and bismuth-germanate (BGO) scintillation detectors will suffice, especially because they are commercially available in large sizes.

Gamma Detectors for Hodoscope Orthogonal Correlation of Scattered Gamma Sources

Total absorption efficiency of a 10 cm×10 cm cylindrical NaI detector would be better than 70% (as much as 90% at 1 Mev). (BGO would be closer to 90%.) Peak-to-total detection-ratio for a 4" NaI detector at 10 MeV is no less than 0.4 and is close to 0.8 at 1 MeV. If one were to choose an approximate a single detector efficiency, the value of $\epsilon$=0.5 could be used for peak detection efficiency in the representative range.

For our 10-cm target diameter at 30 cm distance and 10 cm detector diameter, the solid angle $\Omega$ would be ~0.08. The collimation and shielding inherent in hodoscope design is important in reducing cross-detection of radiation that is not directly associated with out-scattering from the incoming gamma-ray beam. Some direct detection of radiation from the incoming beam can be tolerated as background that is not directly associated with the target of the beam.

Comparative Statistical Efficiency

The HOC method of correlation analysis circumvents the limitations of subtracting large radiation backgrounds from comparatively small signals. This is an cardinal outcome of the HOC methodology. The traditional two-step nuclear-measurement method could make use of a similar or identical pair of orthogonal hodoscope detectors; however, the traditional pair is not ordinarily operated in the correlation mode. For the traditional two-step method, each detector unavoidably measures a combination of source and background, and then the background is subtracted after it is determined by making a separate measurement—if that is possible. The net statistical confidence associated with determining the source strength can thus often be significantly degraded by the statistical impact of the background.

Only when the background B is small compared to the signal S, that is, S<<B—in the traditional two-step process of separate estimation of B and the total measured value—does the result for S gain good statistical quality. In most realistic situations, B>>S, which means that the statistical quality of the desired property D is dominated by the statistics inherent in measurement of B. Often the background B is much larger than the signal S and cannot be determined without a separate measurement. Ignoring statistical variations in kx and ky, the respective standard deviations associated with estimating the value S would be:

$\sigma^2_S = \sigma^2_D + \sigma^2_B$

If $\sigma^2_D$ is large compared to $\sigma^2_S$, then $\sigma^2_S$ will be comparably large and thus be correspondingly imprecise. Moreover, if it were possible to reduce $\sigma^2_B$ by a separate measurement of the backgrounds, then potential systematic errors have to be taken into account in addition to the random statistical errors.

Hardware

Generalized concept for alternative orientations of source and detectors for various conceivable accessible geometries, the basic equipment involved consists of (1) a source of radiation, usually neutron-induced gamma rays, (2) at least a pair of collimated detectors of the induced radiation, arranged orthogonally in such a matter as permitted by the circumstances to minimize conflicting radiation background effects, and (3) an electronic processing system for the collected data, arranged in such a manner as to continuously measure and evaluate correlation effects between the detectors. In addition, decision-making software might also be included so as to carry out pre-determined actions resulting from the data collected.

Other Variations

Detectors

Each detector may be formed of a radiation-sensitive scintillation element to be stimulated by the gamma or neutron radiation and a photomultiplier tube to receive the output from the scintillator element. Several such elements may be placed in each detector assembly. Also, a lead radiation filter may be placed ahead of the detector in the collimator, and other lead filters may be placed in front of each subsequent scintillation element, respectively. Many gamma detectors are available which may be substituted for the sodium-iodide detector described in detail above.

The detection element can be a small sodium-iodide (thallium-activated) scintillation crystal, for example, or other gamma detector with energy discrimination capability. A photomultiplier tube or photodiode associated with each scintillator generates an electric signal that is proportional to the intensity of gamma radiation imposed on the scintillator. The signal from the photomultiplier or photodiode may be transmitted via conductor from the detector to the electronic analysis components and circuitry located outside of the biological shield. Also, with respect to preferred thermal-operation environment, the ambient temperature limit for scintillator detector and photomultiplier assemblies should be considered.

Other Electromagnetic Radiation

The present invention may be applied to electromagnetic radiation other than gamma radiation. For example, X-ray sources may be used in the scatter mode of practicing the present invention in the same manner as gamma radiation. Also there are situations where visible light radiation could be examined by a pair or pairs of visible light detectors having overlapping fields of view. For example, a flame within a target region could be monitored by a pair of visible light detectors with fields of view both of which overlap the target region. If the intensity of the visible light from the flame is small compared to background visible light (such as bright sunlight); the correlation techniques of the present invention may be utilized to distinguish radiation from the flame and the background radiation. The various types of electromagnetic radiation that could be examined utilizing the correlation concepts of the present invention include: gamma radiation, X-radiation, ultraviolet radiation, visible light radiation, infrared radiation and millimeter wave radiation.

Muons and Neutrinos

For those object-detection systems that make use of muons and neutrinos generated from cosmic-ray interactions, and/or neutrinos generated from Earth-origin sources such as nuclear reactors, the HOC method can significantly improve object discrimination. For example, both muon and neutrino detection systems have been considered for detecting fuel reconcentration as an object in the disabled Fukushima reactors. The muon-detection systems, for the most part, rely either on differential scattering or absorption of cosmic-ray induced muons in the heavy metals compared to other less-dense materials in the object. The neutrino-detecton systems, for the most part, rely on a flux of neutrinos originating from the reconcentrated reactor fuel, which is the object of interest. Muon-detection systems also provide a potential means of preferentially detecting concentrations of heavy metals in large commercial cargo containers. An object of interest might be a concentration of banned substance, such as uranium. Aside from their inherently very low differential interaction fractions and rates, both muon and neutrino systems are also severely limited because of substantial background of indistinguishable detected radiation of the same type.

The HOC method can be effectively applied to improve specificity in neutrino or muon detection of heavy metals compared to background effects. The HOC modification to current neutrino and muon detection practice would be similar to that asserted for neutron and gamma detection, namely the addition of a comparable hodoscope orthogonal detector for said neutrinos or muons, operated in the said correlation mode, and—importantly—the analysis of pixelated data from sequential time intervals. Muon detectors sometimes use hodoscope-collimating principles for their detection and definition of muons. This present invention would incorporate such detectors as modified to operate in the said HOC mode. In such applications, because of the very low usable rate of muon or neutrino radiation, the usable interaction rates would be very low, necessitating long recording time intervals, such as hours, days, or months. If photographic film or equivalent active-matrix detectors are used, pixel images collected for equal periods of time could be individually and collectively analyzed, in order to obtain spatial resolution in accordance with the HOC method. For example, passive photographic images—or their active electronic recording equivalent—could be obtained on a daily basis, and the array of pixels would be deciphered and compared on a day-to-day and pixel-by-pixel basis so as to be analyzed with their orthogonal equivalents by the covariance methods taught in this patent application.

The most likely manifestation of this application for muons would be in the use of active radiographic imaging, as taught—for example—in applications of the original patented multi-channel hodoscope array, such that data collected in each active pixel is electronically collected and analyzed as part of an overall mathematically-reconstructed image. In the case of this present patent application the recording medium would necessarily take the form of at least one pair of such orthogonal arrays of detectors. Classical radiographic recordings—whether active or passive—are amenable to the same approach. That is, orthogonal data set from photographs/radiographs—or their electronic equivalent—could be imaged in sequential time increments (hours or days), and each such orthogonal-pair pixel rendition can be compared pixel-by-pixel using correlation methods.

Therefore the scope of the present invention should be determined by the appended claims and not by the examples that have been given.

What is claimed is:

1. A radiation-monitoring diagnostic hodoscope system for monitoring or measuring a radiation source or radiation sources from a target location, said system comprising:
   A) at least one pair of radiation-monitoring hodoscope units, each unit of each pair:
      ) being adapted to detect gamma or neutron or gamma and neutron radiation in a limited radiation beam of less than 50 degrees defining a field of view and
      2) being positioned so that their beams overlap in a region containing all or a part of the target location, and comprising:
         1) a collimating means adapted to identify said limited radiation beam and
         2) at least one radiation detector adapted to produce electrical signals corresponding to intensities of gamma and or neutron radiation in said limited radiation beam;
   B) a computer processor programmed with an algorithm adapted to examine the data recorded by the at least two hodoscope units so as to determine the correlation of the recorded data so as to estimate the extent to which the radiation source or sources originate in the overlap region.

2. The system as in claim 1, wherein each pair of units are positioned so that their fields of view are orthogonal to each other.

3. The system as in claim 1, wherein each pair of units are positioned so that their fields of view are approximately orthogonal to each other.

4. The system as in claim 1, wherein the fields of view of each unit in each pair of units define a center line and the center lines define an angle, originating at a central location in the target region, of less than 30 degrees.

5. The system as in claim 1, wherein the system is adapted for used in circumstances wherein the fields of view include background radiation sources from regions outside the target location.

6. The system as in claim 5, wherein the background radiation detected is large compared to the radiation detected from the target region.

7. The system as in claim 6, wherein the at least one pair of detectors are adapted to record radiation in counts per interval for a series of intervals.

8. The system as in claim 6, wherein the algorithm is adapted to use an analysis of covariance technique to determine to correlation of the data from the two detectors.

9. The system as in claim 8, wherein analysis technique includes Ftest analysis of covariance statistical concepts.

10. The system as in claim 1, wherein the system is a passive system adapted to monitor natural radioactive decay.

11. The system as in claim 1, wherein the system is an active system adapted to monitor radiation produced by activation of a material by neutron source of other source of radiation that originates outside the target region or by other forms of radiation excited by any type of external source.

12. The system as in claim 1, wherein the system is a scatter system adapted to monitor scattered radiation form a source that originates outside the target region.

13. The system as in claim 1, wherein the system is adapted to monitor regions at a nuclear reactor.

14. The system as in claim 1, wherein the system is adapted to monitor regions at a damaged nuclear reactor.

15. The system as in claim 1, wherein the system is adapted to monitor a cargo container or portions of a cargo container.

* * * * *